US011496326B2

(12) United States Patent
Cambou

(10) Patent No.: US 11,496,326 B2
(45) Date of Patent: *Nov. 8, 2022

(54) PHYSICAL UNCLONABLE FUNCTION-BASED ENCRYPTION SCHEMES WITH COMBINATION OF HASHING METHODS

(71) Applicant: Arizona Board of Regents on Behalf of Northern Arizona University, Flagstaff, AZ (US)

(72) Inventor: Bertrand F Cambou, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/160,072

(22) Filed: Jan. 27, 2021

(65) Prior Publication Data

US 2021/0281432 A1 Sep. 9, 2021

Related U.S. Application Data

(63) Continuation-in-part of application No. 16/818,807, filed on Mar. 13, 2020, now Pat. No. 11,283,633.

(Continued)

(51) Int. Cl.
*H04K 1/00* (2006.01)
*H04L 9/00* (2022.01)
(Continued)

(52) U.S. Cl.
CPC .......... *H04L 9/3278* (2013.01); *H04L 9/0643* (2013.01); *H04L 9/0866* (2013.01)

(58) Field of Classification Search
CPC .... H04L 9/3278; H04L 9/0643; H04L 9/0866
See application file for complete search history.

(56) References Cited

U.S. PATENT DOCUMENTS 8,300,450 B2  10/2012  Christensen et al.
8,379,856 B2   2/2013  Potkonjak
(Continued)

FOREIGN PATENT DOCUMENTS

EP  2658166 A2  10/2013
WO  2018063622 A1  4/2018

OTHER PUBLICATIONS

Aumasson, et al., "Improving Stateless Hash-Based Signatures," Smart N. (eds) Topics in Cryptology—CT-RSA 2018. Lecture Notes in Computer Science, vol. 10808, Springer, ChaM, DOI https://doi.org/10.1007/978-3-319-76953-0_12, Online ISBN 978-3-319-76953-0, 24 pp.

(Continued)

*Primary Examiner* — Darshan I Dhruv
(74) *Attorney, Agent, or Firm* — Quarles & Brady LLP

(57) ABSTRACT

A system is configured to derive a set of encryption keys from measured device characteristics of at least one PUF device and communicate with a remote device by performing a cryptographic operation secured by the set of encryption keys. The cryptographic operation includes segmenting a first data stream into a first plurality of data stream fragments, segmenting a first data stream fragment of the first plurality of data stream fragments into a first numeric value and a second numeric value, identifying, using the first numeric value, a first encryption key of the set of encryption keys, and applying a one-way cryptographic function to the first encryption key a first number of times determined by the second numeric value to generate a transformed fragment having a value that depends on the values of the first (Continued)

numeric value and the second numeric value from the first data stream fragment and a value of the first encryption key.

18 Claims, 10 Drawing Sheets

Related U.S. Application Data

(60) Provisional application No. 62/966,930, filed on Jan. 28, 2020, provisional application No. 62/817,966, filed on Mar. 13, 2019.

(51) Int. Cl.
*H04L 9/06* (2006.01)
*H04L 9/08* (2006.01)
*H04L 9/32* (2006.01)

(56) References Cited

U.S. PATENT DOCUMENTS

| | | | |
|---|---|---|---|
| 8,560,849 B2 | 10/2013 | Machani et al. | |
| 8,850,281 B2 | 9/2014 | Potkonjak | |
| 9,032,476 B2 | 5/2015 | Potkonjak | |
| 9,531,540 B2 | 12/2016 | Peeters et al. | |
| 9,985,791 B2 | 5/2018 | Cambou | |
| 2007/0127719 A1 | 6/2007 | Selander et al. | |
| 2010/0322418 A1* | 12/2010 | Potkonjak | H04L 9/0866 380/278 |
| 2011/0002461 A1* | 1/2011 | Erhart | G06F 21/73 340/5.83 |
| 2012/0131340 A1* | 5/2012 | Teuwen | H04L 9/3273 713/168 |
| 2013/0083926 A1* | 4/2013 | Hughes | H04L 9/3247 380/278 |
| 2013/0108038 A1 | 5/2013 | Ciet et al. | |
| 2016/0080156 A1 | 3/2016 | Kaliski, Jr. | |
| 2017/0180140 A1* | 6/2017 | Mai | G06F 21/72 |
| 2017/0244568 A1 | 8/2017 | Brickell et al. | |
| 2017/0357496 A1 | 12/2017 | Smith et al. | |
| 2018/0270058 A1* | 9/2018 | Watanabe | G06F 21/602 |
| 2018/0337793 A1* | 11/2018 | Park | H03K 19/003 |
| 2019/0165956 A1* | 5/2019 | Adham | H04L 9/0838 |
| 2019/0182236 A1* | 6/2019 | Rangaraj | H04L 63/0442 |
| 2019/0199525 A1* | 6/2019 | Mondello | H04L 9/3242 |
| 2019/0207758 A1 | 7/2019 | Cambou | |
| 2019/0238348 A1 | 8/2019 | Cambou | |
| 2019/0280858 A1 | 9/2019 | Cambou et al. | |
| 2020/0052912 A1* | 2/2020 | Lu | H04L 9/3278 |
| 2020/0053061 A1 | 2/2020 | Cambou | |
| 2020/0119932 A1 | 4/2020 | Cambou et al. | |
| 2020/0288078 A1* | 9/2020 | Okura | H04L 9/0869 |

OTHER PUBLICATIONS

Becker et al., "Security Analysis of Index-Based Syndrome Coding for PUF-Based Key Generation," 2015 IEEE International Symposium on Hardware Oriented Security and Trust (HOST), Washington D.C., USA, May 5-7, 2015, DOI: 10.1109/HST.2015.7140230, pp. 20-25.

Buchmann et al., "Hash-based Digital Signature Schemes," in Post Quantum Crytography, Bernstein D.J., Buchmann J., Dahmen E. (eds), Springer, Berlin, Heidelberg. https://doi.org/10.1007/978-3-540-88702-7_3, pp. 35-93.

Buchmann et al.,"On the Security of the Winternitz One-Time Signature Scheme," In: Nitaj A., Pointcheval D. (eds) Progress in Cryptology—AFRICACRYPT 2011. AFRICACRYPT 2011. Lecture Notes in Computer Science, vol. 6737. Springer, Berlin, Heidelberg. https://doi.org/10.1007/978-3-642-21969-6_23, 2011, 17 pp.

De Oliveira et al., "High Performance of Hash-based Signature Schemes," International Journal of Advanced Computer Science and Applications, vol. 8, No. 3, http://dx.doi.org/10.14569/IJACSA.2017.080358, 2017, pp. 421-432.

Endignoux, "Design and implementation of a post-quantum hash-based cryptographic signature scheme," École Polytechnique Fédérale de Lausanne, School of Computer and Communication Scienes, Master's Thesis, Jun. 2017, https://gendignoux.com/assets/pdf/2017-07-master-thesis-endignoux-report.pdf [gendignoux.com], 102 pp.

Fajge et al., "A Novel Approach for Signing Multiple Messages: Hash-Based Signature," International Journal of Invormation & Computation Technology, vol. 4, No. 15, International Research Publications House, 2014, https://www.researchgate.net/publication/305619268_A_Novel_Approach_for_Signing_Multiple_Messages_Hash-Based_Signature [researchgate.net], pp. 1481-1490.

* cited by examiner

| Size of Public-Private Keys (by Blocks of 256-bit) for Various Plain Texts | 128 | 256 | 512 | 1024 | 2048 | 4096 | 8192 | 16384 |
|---|---|---|---|---|---|---|---|---|
| Protocol with Multiple Hashes $H^{256}$ (8-bit) | 16 | 32 | 64 | 128 | 256 | 512 | 1024 | 2048 |
| $H^{1024}$ (10-bit) | 13 | 26 | 52 | 103 | 205 | 410 | 820 | 1639 |
| $H^{4096}$ (12-bit) | 11 | 22 | 43 | 86 | 171 | 342 | 683 | 1366 |

FIG. 9A

| Average Latency: Number of Hashing Cycles (in k) | 128 | 256 | 512 | 1024 | 2048 | 4096 | 8192 | 16384 |
|---|---|---|---|---|---|---|---|---|
| Protocol with Multiple Hashes $H^{256}$ (8-bit) | 2 | 4 | 8 | 16 | 32 | 64 | 128 | 256 |
| $H^{1024}$ (10-bit) | 13 | 26 | 52 | 103 | 205 | 410 | 820 | 1639 |
| $H^{4096}$ (12-bit) | 44 | 88 | 176 | 352 | 704 | 1408 | 2816 | 5632 |

FIG. 9B

PHYSICAL UNCLONABLE FUNCTION-BASED ENCRYPTION SCHEMES WITH COMBINATION OF HASHING METHODS

CROSS-REFERENCE TO RELATED APPLICATIONS

The present application claims priority to U.S. Provisional Application 62/966,930 entitled "Physical Unclonable Function-Based Encryption Schemes with Combination of Hashing Methods" and filed on Jan. 28, 2020, the disclosure of which is incorporated herein by reference.

The present application claims priority to and is a continuation in part of U.S. patent application Ser. No. 16/818,807 entitled "PUF-Based Key Generation for Cryptographic Schemes," filed on Mar. 13, 2020 and published on Sep. 17, 2020 as U.S. Pre-Grant Publication No. 2020/0295954A1, which in turn claims priority to U.S. Provisional Application 62/817,966 entitled "PUF-Based Key Generation for Cryptographic Schemes with Multiple Hashing of Private Keys" and filed on Mar. 13, 2019, the disclosure of which is incorporated herein by reference.

BACKGROUND OF THE INVENTION

Information is frequently encrypted to protect against eavesdropping and unauthorized access using encryption schemes based on the use of one or more encryption keys and other keyless encryption schemes. Encryption schemes are frequently used in conjunction with authentication schemes to improve the security of electronic systems. PUF-based security systems use a PUF device as an "electronic fingerprint" unique to a user or device in possession or control of the PUF device, allowing an authentication system to challenge a client seeking authentication, receive a response generated by the client using a PUF device, and then compare the received with a stored response previously received from the client or derived from characteristics of the PUF device and verifying that the two responses match.

BRIEF SUMMARY

In an example embodiment, a system comprises a processor and memory coupled to the processor. The memory stores device data and executable instructions. The device data represent measured device characteristics of physical-unclonable-function ("PUF") arrays having pluralities of PUF devices, each PUF array belonging to one of a plurality of computing devices. Each computing device of the plurality of computing devices is part of a network of computing devices. When executed by the processor, the executable instructions cause the processor to transmit a processing instruction to a remote device; determine expected measurement values of characteristics of the set of PUF devices measured by the remote device by using the processing instruction to determine and retrieve a subset of the device data stored in the memory and associated with the set of PUF devices measured by the remote device; and derive a set of encryption keys from the expected measurement values; and communicate with the remote device by performing a cryptographic operation secured by the set of encryption keys. Performing the cryptographic operation includes segmenting a datastream into datastream fragments; associating each datastream fragment with a corresponding encryption key belonging to the set of encryption keys; and applying a one-way cryptographic function to the corresponding encryption key for each datastream fragment to generate a transformed fragment having a value that depends on both a value of that datastream fragment and the a value of the corresponding encryption key. The remote device is configured to use the processing instruction to determine a set of PUF devices belonging to the PUF array of the remote device and measure characteristics of those PUF devices.

In another example embodiment, a system comprises a processor, a physical-unclonable-function ("PUF") array of PUF devices, and memory coupled to the processor. The memory stores instructions that, upon execution by the processor, cause the processor to receive a processing instruction; determine a set of PUF devices belonging to the PUF array using the processing instruction and measure characteristics of the set of PUF devices processing instruction derive a set of encryption keys from the measured characteristics of the PUF devices determined using the processing instruction; and communicate with a remote device by performing a cryptographic operation secured by the set of encryption keys. Performing the cryptographic operation includes segmenting a datastream into datastream fragments; associating each datastream fragment with a corresponding encryption key; and applying a one-way cryptographic function to the corresponding encryption key for each datastream fragment to generate a transformed fragment having a value that depends on both a value of that datastream fragment and the a value of the corresponding encryption key.

In another example embodiment, a method of secure communication between a first computing device having a physical unclonable function ("PUF") array of PUF devices and a second computing device storing device data representing characteristics of the PUF array of the first computing device comprises receiving a processing instruction and determining a set of PUF devices belonging to a PUF array using the processing instruction; obtaining characteristics of a set PUF devices determined using the processing instruction and belonging to the PUF array; deriving a set of encryption keys from the characteristics of the set of PUF devices determined using the processing instruction; and performing a cryptographic operation secured by the set of encryption keys. Performing the cryptographic operation includes segmenting a datastream into datastream fragments; associating each datastream fragment with a corresponding encryption key belonging to the set of encryption keys; and applying a one-way cryptographic function to the corresponding encryption key for each datastream fragment to generate a transformed fragment having a value that depends on both a value of that datastream fragment and the a value of the corresponding encryption key.

In another embodiment a system includes a processor, and memory coupled to the processor. The memory stores device data representing measured device characteristics of physical-unclonable-function ("PUF") arrays having pluralities of PUF devices. Each PUF array belongs to one of a plurality of computing devices. Each computing device of the plurality of computing device is part of a network of computing devices. The memory includes executable instructions that, when executed by the processor, cause the processor to transmit a processing instruction to a remote device, wherein the remote device is configured to use the processing instruction to determine a set of PUF devices belonging to the PUF array of the remote device and measure characteristics of those PUF devices, determine expected measurement values of characteristics of the set of PUF devices measured by the remote device by using the processing instruction to identify and retrieve a subset of the device data stored in the memory and associated with the set of PUF devices measured by the remote device, derive a set of encryption keys from the expected measurement values, and communicate with the remote device by performing a cryptographic operation secured by the set of encryption keys. The cryptographic operation includes segmenting a first data stream into a first plurality of data stream fragments, segmenting a first data stream fragment of the first plurality of data stream fragments into a first numeric value and a second numeric value, identifying, using the first numeric value, a first encryption key of the set of encryption keys, and applying a one-way cryptographic function to the first encryption key a first number of times determined by the second numeric value to generate a transformed fragment having a value that depends on the values of the first numeric value and the second numeric value from the first data stream fragment and a value of the first encryption key.

In another embodiment, a system includes a processor, and memory coupled to the processor. The memory stores device data representing measured device characteristics of at least one physical-unclonable-function ("PUF") device and executable instructions that, when executed by the processor, cause the processor to derive a set of encryption keys from the measured device characteristics of the at least one PUF device and communicate with a remote device by performing a cryptographic operation secured by the set of encryption keys. The cryptographic operation includes segmenting a first data stream into a first plurality of data stream fragments, segmenting a first data stream fragment of the first plurality of data stream fragments into a first numeric value and a second numeric value, identifying, using the first numeric value, a first encryption key of the set of encryption keys, and applying a one-way cryptographic function to the first encryption key a first number of times determined by the second numeric value to generate a transformed fragment having a value that depends on the values of the first numeric value and the second numeric value from the first data stream fragment and a value of the first encryption key.

In another embodiment, a method includes deriving a set of encryption keys from measured device characteristics of at least one PUF device and communicating with a remote device by performing a cryptographic operation secured by the set of encryption keys. The cryptographic function includes segmenting a first data stream into a first plurality of data stream fragments, segmenting a first data stream fragment of the first plurality of data stream fragments into a first numeric value and a second numeric value, identifying, using the first numeric value, a first encryption key of the set of encryption keys, and applying a one-way cryptographic function to the first encryption key a first number of times determined by the second numeric value to generate a transformed fragment having a value that depends on the values of the first numeric value and the second numeric value from the first data stream fragment and a value of the first encryption key.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

FIGS. 9A-B are tables illustrating performance characteristics of various hash-bashed cryptography schemes according to embodiments disclosed herein.

DETAILED DESCRIPTION

Figure 1:
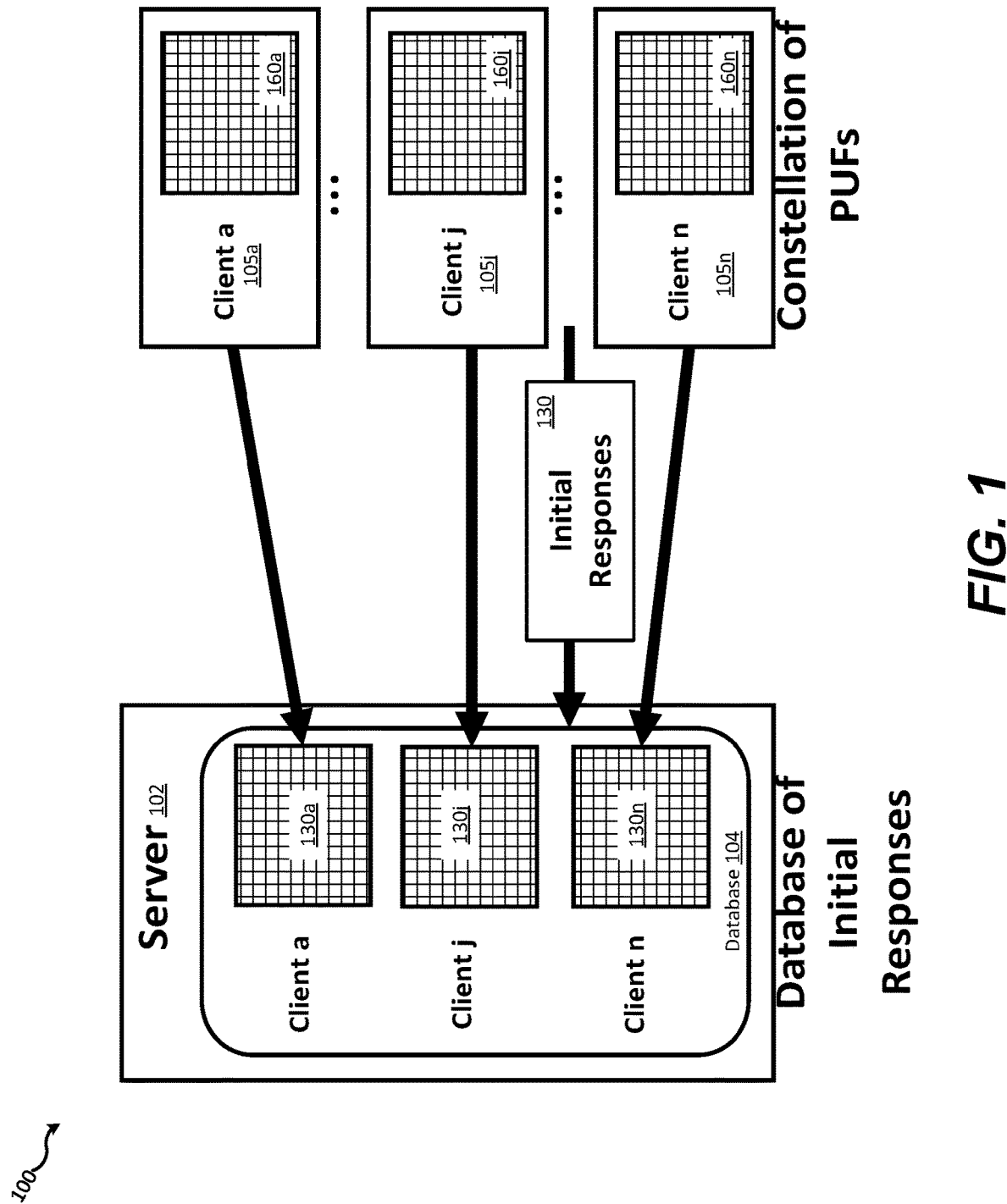
FIG. 1 depicts an enrollment procedure wherein a server issues processing instruction to clients having PUF arrays and stores measurements of PUF devices determined using those instructions for use in subsequent authentication of the clients, according to one embodiment.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource. References to "one-way functions" refer mathematical operations which are easy or practical to compute but whose inputs are difficult or impractical to recover using a known output of the function given the computational resources available. References to "approximately" or "effectively" one-way functions refer to functions that may be easily inverted if additional "secret"

information is known but which are one-way to a party that does not have access any such secret information.

Conventional systems and methods for secure communication frequently rely upon encryption of messages using encryption keys which may be symmetrical or asymmetrical (e.g., in public key encryption schemes). Such key-based encryption schemes have disadvantages. First keys must be generated and stored by various parties, introducing the possibility that the keys may be compromised by a malicious party. Additionally, key-based encryption schemes may be vulnerable to brute force attacks wherein a malicious party may discover the key given access to a message encrypted with that key.

Hash-based computing methods for cryptographic schemes, also referred to as hash-based cryptography (HBC), was an active field of research in the 1980's, but lost its momentum due to the complexity of the public-private key exchange. More recently, interest in HBC has increased, because this is one possible path to design quantum computing-resistant cryptographic schemes. However, the field of use of existing HBC schemes is mainly restricted to digital signature algorithms (DSA). Non-limiting examples of HBC with multiple hashing of private keys are the Winternitz one-time signature (W-OTS), W-OTS+, Merkle signature scheme (MSS), and extended MSS (XMSS).

A hash function H is a one-way cryptographic function transforming a plain text X of any size, into a message digest Y having a fixed length regarding of the size of X according to Equation 1:

$$X \rightarrow Y = H(X).$$

Hash functions used in cryptography (and other suitable one-way cryptographic functions) are pre-image resistant; it is statistically unlikely to find a second plain text X' different than X with the same message digest Y, and to find a second message digest Y' different than Y, hashed from the same plain text X. The hash functions used in HBC are also collision resistant: it is statistically unlikely that two plain texts X, and X' have the same message digest Y.

Multiple hashing is used in digital signature schemes, such as the Winternitz One-Time-Signature (W-OTS), which relies on a public-private key pair exchange. To sign 256-bit long message digests, the private keys are a set of 32 256-bit long streams of random numbers: $X_i$ with $i \in \{0, 31\}$. The public keys are the set of 32 256-bit long streams $Y_i$ that are hashed 256 times according to Equation 2:

$$X_i \rightarrow Y_i = H^{256}(X_i) \text{ with } i \in \{0,255\}.$$

A plaintext P to be signed is hashed to generate a 256-bit long message digest M which is segmented into 32 8-bit long blocks according to Equation 3:

$$M=(m_{0,0} \ldots m_{0,k} \ldots m_{0,7}) \ldots ,(m_{i,0} \ldots m_{i,k} \ldots m_{i,7}) \ldots ,(m_{31,0} \ldots m_{31,k} \ldots m_{31,7})$$

where $i \in \{0, 31\}$ and $k \in \{0, 7\}$

Each block $(m_{i,0} \ldots m_{i,k} \ldots m_{i,7})$ is represented by an integer $K_i$ smaller than 256. The signature of the plain text is the set of 32 256-bit long streams according to Equation 4:

$$S = \{H^{256-N_0}(X_0), \ldots, H^{256-N_i}(X_i), \ldots, H^{256-N_{31}}(X_{31})\}$$

where $i \in \{0, 31\}$ and $X_i \rightarrow s_i = H^{256-N_i}(X_i)$. The signature is valid when all 32 $v_i$ verify such that $v_i = Y_i$ (Equation 5).

This signature is strong, and quantum computing resistant, however the public-private key pair exchange, however the size of the private-public key pairs are long: 256×32=8,192 bits are needed to sign a 256-bit long message digest. The latency could be long because of the need to perform 256×32 hashing cycles for each signature. Accordingly, the improvement of the efficiency of HBC has been a topic of recent interest. The vast majority of existing methods aim to enhance digital signature schemes (DSA) and do not suggest generic encryption methods. It has been suggested that tokens, physical unclonable functions, and other hardware-based solutions can generate cryptographic keys; however, the applicability to HBC is not clear.

Accordingly, embodiments disclosed herein address these and other shortcomings by using physical unclonable function ("PUF") generators in combination with HBC and/or other encryption schemes to eliminate the need to exchange long public keys, thereby improving security and making the encryption of long messages practical. PUF generators can be thought of as "wallets" of keys that are addressable though a handshake with a server. Rather than exchanging keys through insecure communication channels, both parties exchange (or independently access) random numbers and instructions and generate the keys directly from their "wallets." Thus, large numbers of keys can be made available for use with hash-based cryptography, without requiring large exchanges of information over communication channels which may weaken security and/or impose performance penalties.

In the context of this disclosure, a processing instruction is any information used to cause an APG to produce an expected response (sometimes referred to as a "challenge response" in the context of authentication systems) corresponding to that information by measuring one or more PUF devices. Processing instructions may be used to cause an APG to access devices (or ranges of devices) in an array of PUF devices belonging to the APG. Along these lines, a processing instruction may be input supplied to an APG which is used to produce a response having one or more expected values which depend upon characteristics' of the PUF array belonging to the APG to which the processing instruction is issued. The appropriate may be derived from those characteristics using instructions stored by the APG or other processing circuitry, received by the APG or other processing circuitry and/or additional information supplied to the APG or other processing circuitry (such as a password of a user). In one simple non-limiting example, a processing instruction processing instruction might simply cause an APG to return the values stored by devices of a PUF array at a specified address or range of addresses. In other non-limiting examples, a processing instruction processing instruction might include instructions to perform a mathematical, logical, or other operation(s) on those values.

An array of addressable PUFs can be used as an addressable wallet of cryptographic keys. The PUFs are the "fingerprints" of microelectronic components such as memory devices. During enrollment, the fingerprint of the PUF of the client device is memorized by the server in the form of a lock up table, or cryptographic table. Assuming that the PUF is reliable, the same reading can be extracted on demand. Error matching and correcting methods can take care of the potential mismatches when the PUF is subject to aging, temperature changes, or environmental variations. A processing instruction generated by the server side may become a "public key" that is openly shared between communicating parties. The processing instruction may be hashed with an additional password, PIN code, and/or biometric data (e.g., fingerprint, vein pattern, or retinal data). In some embodiments, both a server and a client device (or other such devices) that share access to data representing characteristics of a PUF itself can independently generated encryption key pairs according to any suitable asymmetric encryption scheme. While such asymmetric key pairs frequently referred to as "public" and "private" keys, it should be noted that the embodiments herein enable the use of such key pairs without the need for a so-called "public" key to be published or made publicly available in any way, while still realizing the other known benefits of public/private key encryption.

Non-limiting examples of measurable physical characteristics of devices used in PUF arrays are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., '0' or '1') after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the '0' or '1' state could be used as a characteristic of that device. Other non-limiting examples of suitable characteristics include optical measurements. For instance, a PUF device may be an optical PUF device which, when illuminated by a light source such as a laser, produces a unique image. This image may be digitized and the pixels may be used as an addressable PUF array. A good PUF should be predictable, and subsequent responses to the same processing instruction should be similar to each other (and preferably identical).

Additional non-limiting examples of measurable physical characteristics of devices used in PUF arrays are currents induced by an applied input voltage or current, voltages of various circuit elements during operation of a PUF device in response to an input or other stimulus. Further non-limiting examples may include derived quantities such as resistance, conductance, capacitance, inductance, and so on. In certain embodiments, such characteristics of a device may be functions of an input or stimulus level of the device. For example, a current-voltage characteristics of memristors and other devices may be non-linear. Thus, the measured resistance of a memristor will depend on a current or voltage level applied during the measurement process. If a memristor or device with similar characteristics is operated within a non-hysteretic regime, the measured resistance may be a predictable function of the input stimulus (e.g., an input current supplied by a current source). Thus the relationship between applied current and voltage measured across a memristor (or between applied voltage and current measured through the memristor) is one example of a non-linear transfer function which can be exploited to produce multiple discrete or continuous characteristic values using a single PUF device.

According to various embodiments, an encryption protocol enabled by PUFs includes the following stages: (1) Enrollment, (2) Handshaking, (3) Ciphertext Generation, and (4) Ciphertext Decryption. These stages are described below, beginning with reference to FIG. 1 illustrating an example environment 100 in which embodiments disclosed herein may be practiced. The environment 100 includes a server 102 and client devices, hereinafter clients 105 (represented by clients 105a, 105j, and 105n). The server 102 manages a database 104 which may be stored in memory of the server 102. The database 104 stores characteristics of the PUF arrays 160 of each client (i.e., "images" of each PUF array 160), which may be generated in response to processing instructions issued by the server 102 to the clients 105, each of which may respond to the processing instructions by accessing a respective PUF array 160 represented by the PUF arrays 160a, 160j, and 160n belonging to clients 105a, 105j, and 105n. Alternatively, the server 102 may be otherwise provided with information suitable to generate the initial responses 130.

A PUF array 160 may form parts of an addressable PUF generator (APG), described further below, which may contain additional processing circuitry and execute instructions for generating processing instruction s. Enrollment is performed for each client 105 in a secure environment. After enrollment, the constellation of clients 105 may operate in an insecure environment and communicate with each other over public networks. Secure information needs to be encrypted.

Figure 2:
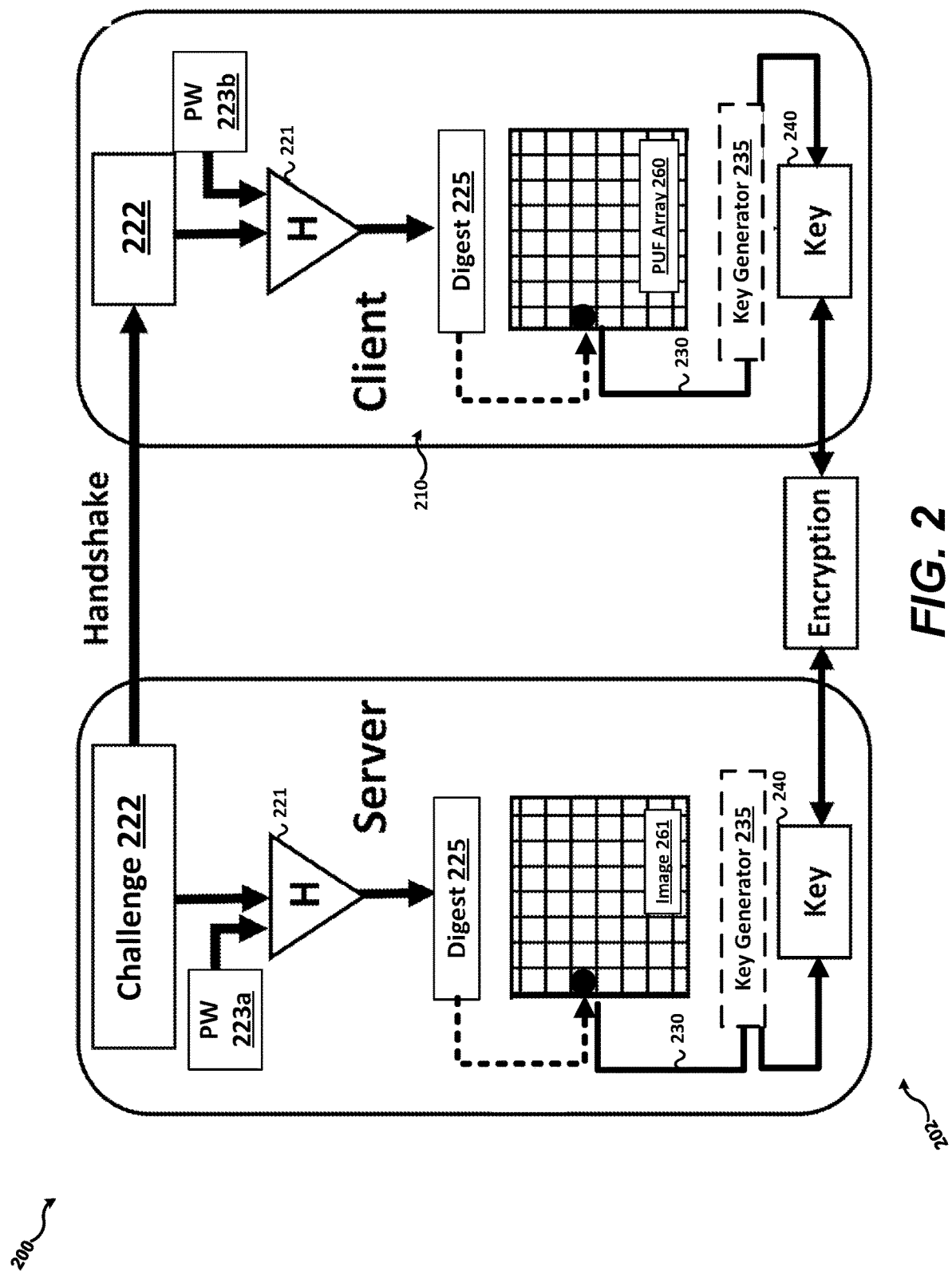
FIG. 2 is a block diagram of a client device with an addressable PUF generator (APG), interacting with a server to independently generate shared encryption keys.

FIG. 2 illustrates a simplified example embodiment 200 of where a client 205 (i.e., having an APG communicates with a server 202 according to an encryption scheme in which the server 202 and client 205 communicate securely be encrypting communications between them with an encryption key 240 that is independently generated by the client 205 and the server 202 using a processing instruction 222 issued by the server 202 to the client. The APG 210 includes a PUF array 260 which may be accessed by a microcontroller of the APG 210 or other processing circuitry of the client 205. The PUF array 260 of a client 205 is an array of electronic or other devices with measurable physical characteristics, configured in an addressable array similar to an addressable memory device such as RAM or ROM chip. Due to small variations which occur during semiconductor manufacturing or other manufacturing processes, each PUF device (and hence each PUF array 260) may be unique, even if the PUF arrays are mass-produced by a process designed to produce nominally identical devices. The PUF array 210 (shown as a 2D-array of cells) of a client 205 may be accessed by the client 205 which receives processing instructions 222 (originating in this example from the server 202). The APG 210 responds by to processing instructions 222 by generating responses 230 using measured characteristics of one or more PUF devices within the PUF array 260 identified by the processing instruction 222 or derived from it using instructions stored by the APG 210. As shown, the processing instruction 222 (which may be a random number, seed value, or any other suitable string, bitstream or other information) may be used to generate a digest 225 using a hash function 221. The digest 225 may be used to specify an address or range of addresses in the PUF array 260 (or the image 261 of the PUF array 260) Additional security may be provided by combining the processing instruction 222 with an optional password such as the password 223a for the client 202 and the password 223b for the client 205. The passwords 223a, b may be the same or different.

The APG 210 contains a PUF array 260 that is unique to the client 205. The APG 210 of the client 205 may be used to generate numerous responses 230 unique to that client 205. These responses 230 cannot be replicated by an attacker without physical access to the PUF array 260. The responses 230 may be used as the encryption key 240 or may be otherwise used to derive the encryption key 240. The server 202 may similarly use the image 261 of the PUF array 260 and the processing instruction to independently generate the key 240 or derive it.

After clients 205 are enrolled with the server 202, embodiments disclosed herein may be utilized to authenticate the client 205 and produce the encryption key 240 which the server 202 and client 205 may use to communicate securely. First, the server 202 and the client 205 enter the Handshaking stage. In the Handshaking stage an objective is for the server 202 to transmit the information needed to identify a particular portion of the PUF array 260 of the client 205. Both the server 202 and the client 205 can independently produce a response to the processing instruction 222: the server can lookup information about the PUF array 260 obtained during enrollment (or otherwise supplied to the server 202) and the client 205 can retrieve the same information by using the APG 210 to access the PUF array 260.

During Handshaking, the server 202 issues a processing instruction 222 to the APG 210 of the client 205. This processing instruction 222 is used by the APG 210 to identify the portion of the devices belonging to the PUF array 260 to access. This processing instruction 222 may be a random number. In some embodiments, the server 202 and the client 205 may have access to the same random number generator or may have synchronized random number generators. In such embodiments, the server 202 does not need to transmit the processing instruction 222 to the client 205 in order for the client 205 to generate the processing instruction 230 using the APG 210.

In some embodiments the ability of the client 205 to generate the response 230 may be protected by a password such as the password 223b. In such embodiments, the address specifying which device(s) in the PUF array 260 to access may be produced by combining the processing instruction 222 with the password. As a non-limiting example, the client 205 may input the password and the processing instruction into a hash function to produce the address in the PUF array 260. As an example, if the PUF array 260 is represented as a two-dimensional array containing 256 rows and 256 columns, 8 bits of the message digest can be used to find a first coordinate X in the PUF array 260; the following 8 bits can be used to find a second coordinate Y.

The measurement of characteristics of individual PUF devices may not be perfectly deterministic. As part of the Handshaking process, the server 202 may send additional information to the client 205 for use in making generation of the processing instruction 230 more reliable. Such information may include a checksum or other error-correcting information for use with error-correcting codes, or other information or instructions used in response generation schemes to be discussed later below. Upon receiving the processing instruction 230, the APG 210 may use the additional to generate corrected response or exclude unreliable devices belonging to the PUF array 260 from the response generation process. The server may determine that certain devices of the PUF array 260 are unreliable using the image 261 of the PUF array 260 and may transmit information identifying unreliable devices to the client 205. The client 205 may also independently determine that certain devices are unreliable such that both the server 202 and the client 205 agree on devices which should be excluded. Other error-correction methods may also be employed.

One approach for dealing with non-zero error rates entails repeated measurement of the characteristic(s) of the PUF devices forming a PUF array such as the PUF array 260. During Enrollment, the server may issue each possible processing instruction repeatedly and track the statistical distribution of values measured for each PUF device. The server may then determine that certain PUF devices are "unreliable" and should not be used to generate responses and store information to that effect. During Handshaking, the server may then transmit that information to the client or the client may already store similar or identical information.

Additional methods for error reduction may be used to augment or replace the approach above. One such additional method also entails repeatedly measuring each PUF device and assigning values to the measured characteristic(s) of that PUF device based on the ranges of the measurement values. For instance one value may be assigned to measurements that fall within a first range and another value assigned to values in a second range exclusive of the first range, and so on. As long as the measured values for a device remain within one range, that device may be used to produce a reliable value during response generation. As before, devices which are "unreliable" (i.e., their measured values do not remain within a single range, or deviate from that range with unacceptable frequency) may be excluded from use in response generation and other procedures requiring reliable values.

The techniques disclosed above in connection with FIG. 2 may be applied to schemes in which more than one encryption key is required and in schemes where one or more key pairs are required (including asymmetric encryption schemes such as public/private key schemes, as one non-limiting example). A message digest may be used to generate an address $A_{i,j_1} = \{x_i, y_i\}$ in a PUF array or suitable cryptographic table. For example, with a two-dimensionally-indexed 256×256 cryptographic table, the first eight digits of the hash message can be the column address $x_i$ and the next eight digits can be the row address $y_j$. The private key $C_{i,j_1} = \{C_{i,j_1}^1, \ldots, C_{i,j_1}^k\}$ is then a stream of k binary bits located in the cryptographic table following address $A_{i,j_1}$. The public processing instruction transmitted is $Pub_{i,j_1} = T_{i,j_1}$. The communicating parties can therefore separately use the private keys to encrypt and decrypt messages with symmetrical encryption schemes such as AES or DES. The random number $T_{i,j_1}$ can also be dynamically changed to a different number, e.g., $T_{i,j_2}$, resulting in a different processing instruction, resulting in different addresses $\{A_{i,j_2}\}$, and different private keys $\{C_{i,j_2}\}$. It is important to notice that in this protocol, the communicating parties independently generate the keys from the random number and find the same address in their cryptographic tables. The cryptographic table of each client device is distinct from each other, and the method to extract the private key varies based on the content stored in each table. This method to exchange keys needs to be changed to be applicable to hash-based cryptography, as described below. Unlike the DSA presented above, the novel scheme presented herein is a generic encryption method applicable to the exchange confidential information. This generic method can encrypt messages in addition to being able to be used for digital signatures. As noted above, embodiments disclosed herein may be used in conjunction with public/private key encryption schemes without the need to publish or disclose the so-called "public key," as described further below.

FIG. 2 broadly describes embodiments where a PUF array (e.g., the PUF array 260) is used to reduce or eliminate the need to exchange keys between parties prior to the exchange of encrypted communications. Thus, embodiment 200 and related embodiments are compatible with numerous encryption schemes. In the simplest such scheme, the response 230 are used directly as a shared encryption key (i.e., for symmetric encryption). The client 205 and server 202 use information describing the PUF array 260 to independently arrive at the same key 240 (or multiple keys 240). In embodiment 200, both the client 205 and server 202 are depicted optionally using a key generator 235 to produce keys 240 from the responses 230. The key generator 235 may employ any suitable algorithm to generate keys including (but not limited to) using cryptographic hash functions and/or other one-way functions, or approximately-one-way functions such as functions which are effectively one-way unless a party has access to secret information (i.e., so-called "trapdoor functions"). As one non-limiting example, the key generator 235 may implement an algorithm which generates a public key from a private key input according to a particular asymmetric encryption scheme, non-limiting examples of which include elliptic curve encryption, Diffie-Hellman, El-Gammal, DSA, et al. In such instances, the responses 230 may be used as a private key input to an acceptable key generation algorithm or a private key may be derived from the response 230 using any suitable method. Along these lines, the client 205 and server 202 may exchange encrypted information using any suitable encryption scheme once the key 240 (or keys 240) has been determined. The two parties may use symmetric encryption, asymmetric encryption, or hybrid methods including key encapsulation techniques as non-limiting examples. Notably, in certain embodiments, the client or server may encrypt a message or otherwise use a "public key" without any requirement that this public key be known to any party other than the server 202 and/or client 205. It will be understood that the term "public key" in this context is used to mean a key that conforms to an asymmetric encryption scheme specifying "public" and "private" keys. Thus, in the context of this disclosure, the term "complementary key" may be used to describe what is frequently called a public key in asymmetric cryptography schemes.

Specific non-limiting examples of cryptographic schemes which may be augmented with systems and method disclosed herein include: Kyber, Crystals-Kyber, FrodoKEM, LAC, NewHope, NTRU, NTRU Prime, Round2, HILA5, Round5, SABER, Three Bears, McEliece, NTS-KEM, BIKE, HQC, LEDAkem, LEDApkc, LEDAcrypt, LAKE, LOCKER, Ouroboros, Ouroborus-R, Rollo, RQC, SIKE, Dilithium, Falcon, qTesla, GeMSS, LUOV, MQDSS, Rainbow, Picnic, WOTS, WOTS+, FORS, SPHINCS+, and others. It will be appreciated that the examples above represent disparate classes of encryptions schemes including lattice-based schemes, code-based schemes, hash-bashed schemes, and so on. It will be further appreciated that embodiments disclosed herein are applicable for use with these and many other schemes.

Figure 3:
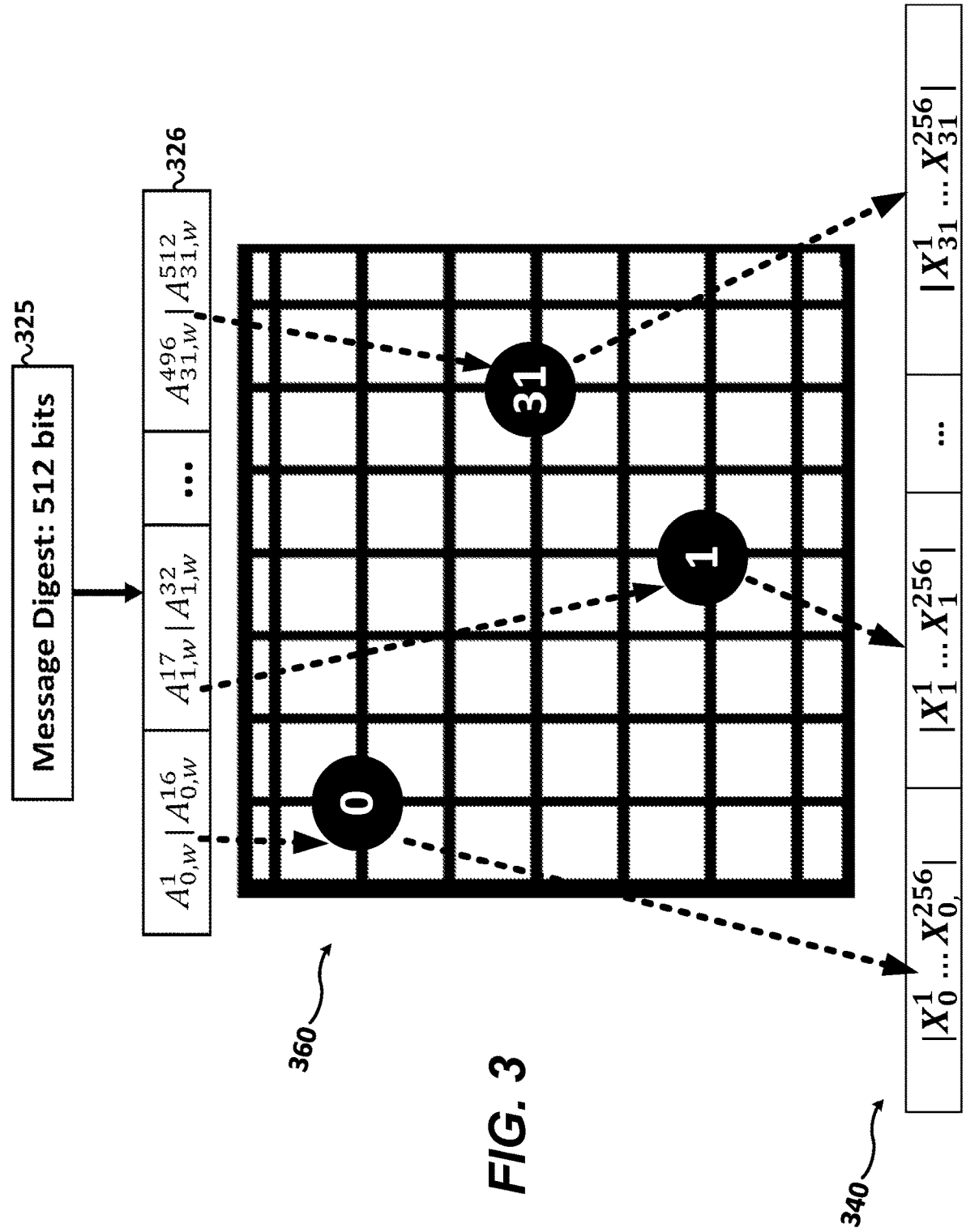
FIG. 3 is a schematic illustration of the use of a 512-bit message digest to produce multiple 256-bit keys using an APG.

In order to better illustrate and describe embodiments herein, example embodiments where a client and server employ hash-bashed cryptographic schemes to communicate, enabled by PUF arrays will now be described. However, nothing herein is intended to limit embodiments to the use of hash-bashed cryptographic schemes. FIG. 3 illustrates an example method suitable for use with embodiments disclosed herein to generate multiple keys 340 from a single processing instruction (e.g., the processing instruction 222). A 512-bit message digest 325 generated from a processing instruction as described above is segmented into 32 fragments. Each fragment is 16 bits in length and is used to identify an address in a PUF array 360. A device or devices in the PUF array at each address 326 may be measured to produce a response (e.g., a response 230) which may be used as a key 340. For example, a set of devices, at location '0' starting with a device at the 16-bit address $A_0 = \{A_0^1 \ldots A_{16}^1\}$ may be measured to produce a response yielding a 256-bit-long key 340 denoted by $X_0 = \{X_0^1 \ldots X_0^{256}\}$. In some embodiments, 256 devices may be measured to produce each key 340 while in other embodiments, fewer devices may be measured and a shorter response may be used to generate a longer key using a hash function as one non-limiting example. The keys 340 may be used in a symmetric and asymmetric encryption schemes. For instance, in some embodiments, the keys 340 may be used as private keys from which public-keys may be derived using a suitable one-way (or approximately one-way) cryptographic function. Non-limiting examples of suitable one-way functions include public key generation functions, hash functions such as SHA-1, SHA-2, SHA-3, SHA-512, SHA-256, SHA-384, SHA-512, MD5, MD6, SWIFT, RIPEMD-160, bcrypt, Whirlpool, BLAKE2, BLAKE3, and others.

Figure 4:
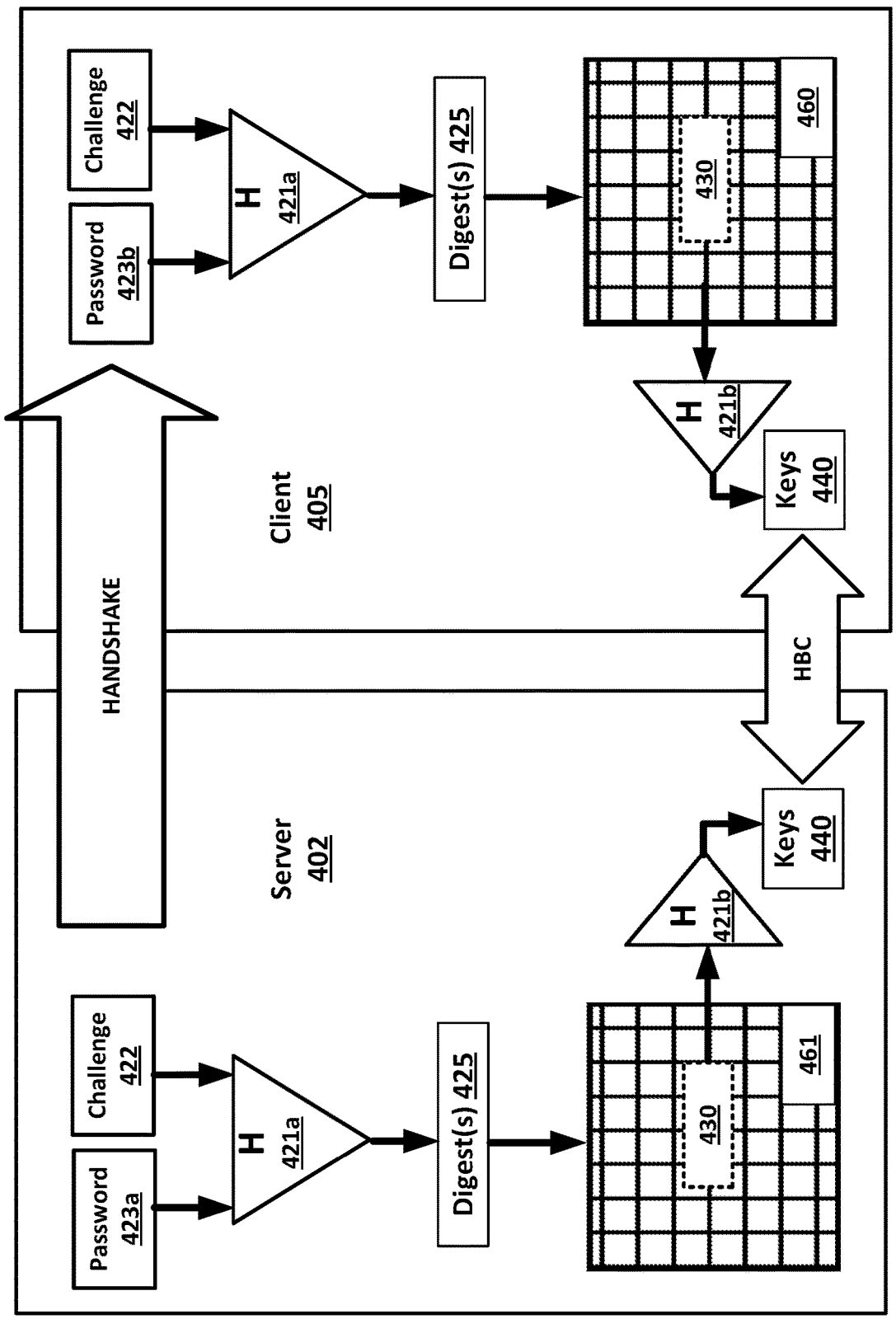
FIG. 4 is a flow diagram illustrating encryption and decryption processes in a hash-based cryptography scheme according to certain embodiments.

FIG. 4 shows an example embodiment 400 in which a server 402 communicates securely with a client 405 using a hash-based cryptography (HBC) scheme enabled by the use of PUFs as described above. Because the server 402 and the client 405 can both independently generate (or access) information describing the PUF array 460, there is no need to directly exchange any keys between the two parties. In this scheme, as described above, the server 402 stores an image 461 of a PUF array 460 belonging to (or otherwise controlled by or associate with) the client 405. In the embodiment shown, the server 402 issues a processing instruction 422 to the client 402 via the Handshaking process described above. At each handshake the server 402 and client 405 independently generate a set of N 256-bit of private keys $\{X_i\}$, where $i \in \{0, N-1\}$. N is a parameter chosen based on the length of the message to encrypt. The processing instruction 422 may be converted into a message digest 425 generated from the processing instruction 422 using the hash function 421a, for example. An address in the PUF array 460 and/or other instructions may be extracted from the message digest 425 by either the server 402 or the client 405, as appropriate. For example, the client 405 may use measurements of the PUF array 460 specified by the digest 425 to generate a ciphertext from a message, as described further below, and transmit the ciphertext to the server 402. The server 402 may then decrypt the ciphertext 440 using device characteristics stored in the image 461 of the PUF array 460 at a location (or locations) identified by the digest 425 to recover the message. Likewise, the server 402 may also encrypt a message using the image 461 of the PUF array 460 to form a ciphertext for transmission to the client 405. In this instance, the client 405 may use characteristics of the PUF array 460 measured at a location (or locations) within the PUF array 460 specified by the digest 425. In some embodiments, the server 402 and client 405 may access a shared random number generator or have synchronized random number generators. In such embodiments, the processing instruction 422 may be a random number generated by the shared random number generator of independently generated by the server 402 and the client 405. In such embodiments, the server 402 may not need to send the processing instruction 422 to the client 405. In other embodiments, the client 405 may generate a ciphertext and transmit the processing instruction to the server 402, thereby allowing the server to recover a plaintext message from the ciphertext.

The message digest 425 may be divided into a set of addresses $\{A_0 \ldots A_n\}$ as illustrated in FIG. 3 that identify locations of particular PUF devices in the PUF array 460 (or locations of data associated with those devices in the image 461 of the PUF array 460). Generally, in certain embodiments, the client 405 may divide the message 430 into fragments and express those fragments as binary numbers. For each fragment, the client device may associate that fragment with one of the addresses. The client device 405 may then access a PUF device belonging to the PUF array 460 at the address associated with that fragment and measure a characteristic of that PUF device. The client 405 may then encode each message fragment using a transformation based on a value of that message fragment (e.g., the binary representation of that message fragment) and the measured characteristic of the associated PUF device. Because only the server 402 and the client 405 can measure (or retrieve) characteristics of the PUF devices belonging to the PUF array 460, only the server 402 can decrypt messages encrypted by the client 405. Similarly, only the client 405 can decrypt messages encrypted by the client 402 using characteristics of the PUF array 460 of the client 405. For increased security, the message may be segmented into multiple segments (i.e., blocks) and a new randomly generated processing instruction 422 may be used to determine the cipher scheme for each segment of the message. The number of addresses in the set of addresses may also be adjusted to allow the encryption of messages of various lengths. Further details are discussed below.

In an example, the processing instruction 422 is used to generate the message digest 425 using a standard hash function (experimental validation was performed using SHA-3, for example). Other suitable hash functions are MDA, SHA-1, and SHA-2, as non-limiting examples. A message may be subdivided into multiple bitstreams, collectively used to form the addresses $\{A_0 \ldots A_n\}$. In some embodiments, it may be desirable to specify a large number of addresses (and/or a number of long address) using a single message digest 425 derived from a single processing instruction 422. In hash-based cryptography schemes described herein, responses 430 to processing instructions 422 are used to generate keys 440 by repeatedly hashing the responses 430 using a hash function 421b. The hash function 421b may be the same as the hash function 421a, or the two hash functions 421a,b may be different from each other.

Figure 5:
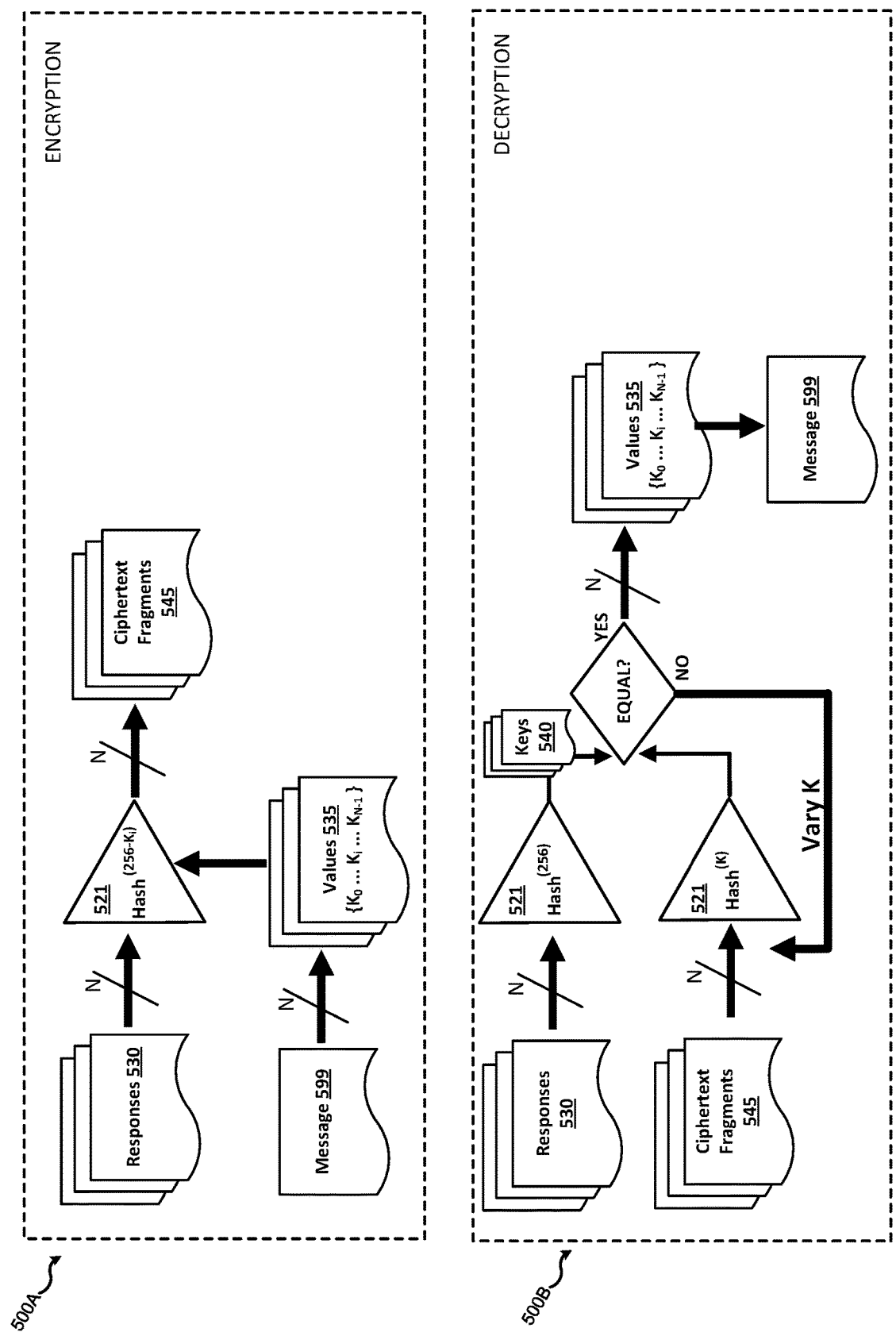
FIG. 5 is a flow diagram illustrating cryptographic signing and signature verification processes in a hash-based cryptography scheme according to certain embodiments.

The process of decryption and encryption is illustrated by FIG. 5, which includes the flow diagrams 500A and 500B corresponding to the encryption and decryption process respectively. Starting with the private keys $\{X_i\}$, (i.e., responses 530), the keys $\{Y_i\}$ (i.e., keys 540) may generated with 256 sequential hashing cycles as given by Equation 6:

$$X_i \to Y_i = H^{256}(X_i) \text{ where } i \in \{0, N-1\}.$$

In departure from the generic HBC methods, both $X_i$ and $Y_i$ are kept secret, and the only public information is the data exchanged during the handshakes. In a second departure from the generic HBC methods, the plaintext M (i.e., the message 599) to be encrypted is not hashed; instead, it is converted to a digital stream and then segmented into N bytes (i.e., the values 535 denoted by $\{K_0 \ldots K_i \ldots K_{N-1}\}$. As shown below, for each handshake, it is practical to encrypt messages that are up to 4,096-bits long (i.e., N=512). Multiple handshakes may be needed for longer messages, and each handshake may produce a new set of private keys $X_i$.

The message M can be then written as Equation 7 as follows, with $i \in \{0, N-1\}$; $k \in \{0, N-1\}$; $m_{i,k} \in \{0,1\}$:

$$M = (m_{0,0}, \ldots m_{0,k}, \ldots m_{0,7})(m_{i,0} \ldots m_{i,k} \ldots m_{i,7}(m_{N-1,0} \ldots m_{N-1,k} \ldots m_{N-1,7}).$$

Each of the N bytes of M can be written as an integer $K_i \in \{0, 256\}$. Thus, $M = (K_0), \ldots (K_i), \ldots (K_{N-1})$. A ciphertext may be formed by generating a set of N 256-bit long streams $C_i$ (i.e., the ciphertext fragments 545) with $i \in \{0, N-1\}$ by repeatedly hashing the private keys $X_i$ (i.e., the responses 530) using the hash function 521, as given by Equation 8:

$$C_i = H^{256-K_i}(X_i).$$

Unlike the digital signature scheme presented previously, the receiving party does not have access to M, so the decryption process is different. The N streams $C_i$, (i $\in \{0, N-1\}$) of the ciphertext (i.e., the ciphertext fragments 545) are decrypted separately by hashing each stream multiple times using the hash function 521 and comparing the result with the corresponding key 540 obtained by hashing the responses 530 256 times using the hash function 521. The receiving party (e.g., a client 205, 405) finds the value $K_i$ such that hashing the corresponding ciphertext fragment 545 $K_i$ times yields the corresponding key 540 (i.e., the corresponding $Y_i$ which in turn is equivalent to the corresponding $X_i$ hashed 256 times). Combined together, the N separate solutions $K_i$ (i.e., the values 535) generate the plaintext message 599 when concatenated. The hardware or software implementations of hash functions such as SHA-2 are fast, and therefore the new encryption scheme is quite rapid. The PUF-based key generation is also fast, because only the handshake is needed at each generation cycle; therefore, a new set can be use frequently to enhance security. Notably, the use of PUFs disclosed herein enables the practical use of multiple hashing as part of a full encryption scheme for arbitrary messages instead of only being useful in the limited context of digital signatures. This because both parties have secure access to the responses and can generate all repeatedly hashed values described without the need to communicate or otherwise share any additional information beyond the appropriate processing instruction (e.g., the processing instruction 222, 422, 722). It will be understood that repeated hashing with a hash function such as the hash function 521 in this and other examples is intended for purposes of illustration only and that any suitable one-way cryptographic function(s), as described above, may be used.

Figure 6:
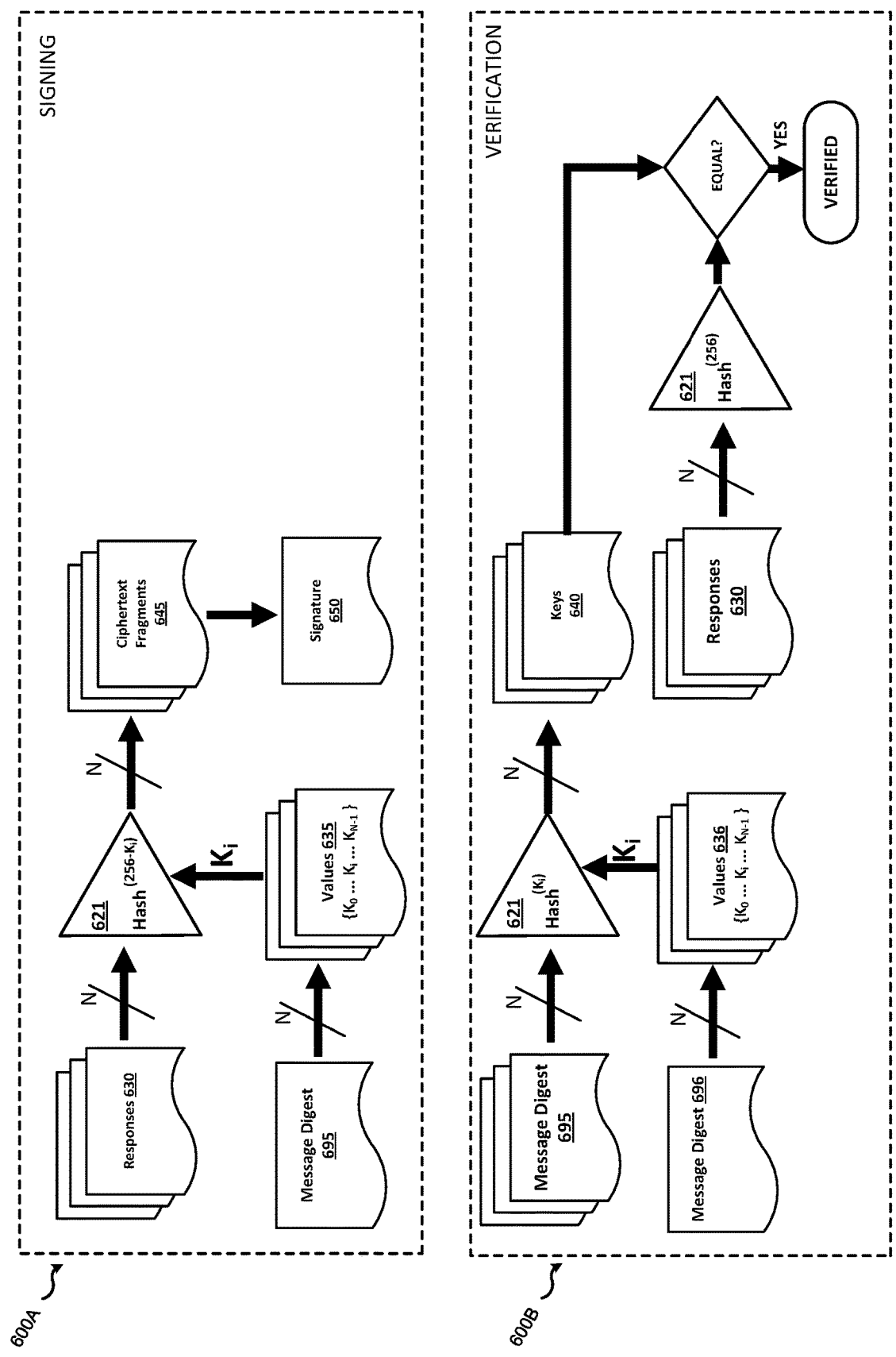
FIG. 6 is a flow diagram depicting an encryption procedure that may be practiced using the embodiment of FIG. 4.

As illustrated by FIG. 6, the encryption scheme disclosed above can also operate as a digital signature scheme. As shown in flow diagram 600A, a digital signature can be produced by producing a message digest 695 of a plaintext message or other information using any suitable hash function (not shown). The digest 695 is then treated as a message to be encrypted analogously to the process illustrated in FIG. 4. The digest 699 is rendered into a series of integer values 635. A set of responses 630 are generated as described above. Each of the N integer values 635 are used to determine a number of times the corresponding response 630 will be hashed using the hash function 621. In this example, each response 630 (i.e., each $X_i$) is hashed (256–$K_i$) times, producing a set of N ciphertext fragments 645. These fragments collectively serve as a signature 650 which can be verified as described below. A sending party (e.g., a client 205, 405) with access to a PUF array (e.g., a PUF array 260, 460) image of a PUF array (e.g., an image 261, 461), or other private cryptographic table can then send a message including the signature 650 to a receiving party with access to the same information (e.g., a sever 202, 402).

The flow diagram 600B illustrates the process of verifying the signature 650 used to sign a plaintext (not shown). The receiving party (e.g., the server 202 or server 402) receives the signed plaintext and independently creates its own cryptographic digest 696 of the received message (using the same hash function as the sending party) and coverts it into a series of values 636. Because the two parties share access to the details of a PUF (or similar securely shared information), the receiving party does not need to search for each of the values 636 (compare to the flow diagram 500A). Instead, the receiving party independently determines the values 636 using its independently generated message digest 696. Once the values 636 are determined, the receiving party only needs to determine that hashing each of ciphertext fragments 645 of the signature 650 $K_t$ times with the hash function 621 reproduces each of the keys 640 (i.e., each $Y_i$) which may be independently generated by hashing the responses 630 using the hash function 621 256 times. It will be understood that repeated hashing with a hash function such as the hash function 621 in this and other examples is intended for purposes of illustration only and that any suitable one-way cryptographic function(s), as described above, may be used.

The methods disclosed above implicitly assume that both the sending and receiving parties can independently generate the same responses and thus derive identical keys given the same processing instruction (e.g., processing instructions 222, 422). However, as a discussed above, some of the responses obtained from a PUF array (e.g., PUF arrays 260, 460) may be non-deterministic or may be subject to drift due to temperature, aging, and/or other effects. Thus, as shown in FIG. 6 a server 702 may be equipped in some embodiments with a matching engine 750 configured to correct for discrepancies between responses 731 retrieved from an image 761 of a PUF array 760 belonging to a client 705 and the responses 730 generated by the client 705 directly from the PUF array 760. In some embodiments, the matching engine 750 may be configured to generate error-correction information 724 based on statistical or other measurements of characteristics of the PUF array 760 obtained as part of the Enrollment process. The error-correction information 724 may contain checksum or other error-correction information for use by the client 705 in order to correct errors in the responses 730 before hashing the responses 730 for use in hash-based cryptography schemes disclosed herein.

As part of the Handshaking process, the server 702 may send the error-correction information 724 to the client 705 for use in making generation of the responses 730 more reliable. The instructions may include error correction instructions (sometimes called a "helper" or "helper instructions") and/or masking instructions. Error correction instructions may include a checksum or other error-correcting information for use with error-correcting codes, or other information or instructions used in response generation schemes to be discussed later below. Masking instructions may instruct the client 705 exclude cells which the server 702 characterized as unreliable cells during Enrollment. The client 705 may generate corrected responses which simply exclude measurements of the unreliable cells. Alternatively the client 705 may measure additional cells to ensure that the corrected responses are of a specified length. The client may store instructions for selecting the additional cells to measure, or may receive such instructions as part of the error-correction information 724.

Upon receiving the error-correction information 724, the client 705 may use additional information contained in the error-correction information 724 to generate corrected responses. Use of the error-correction information 724 and other methods of improving the reliability will be discussed further below. The corrected responses 730 may be used to derive the encryption keys 740. The server 702 may similarly independently produce the encryption keys 740 using the initial responses 730 stored in a database (e.g., database 104). The server 702 and the client 705 may then communicate securely by encrypting messages using the shared encryption keys 740 according to methods disclosed herein.

In some embodiments, ternary PUF schemes may include characterizing each PUF device in a PUF array (e.g., PUF arrays 160, 260, 460, 760). During Enrollment, the server issues each possible processing instruction repeatedly and tracks the statistical distribution of values included in the responses. The server then assigns the elements of each processing instruction corresponding to individual PUF devices to one of three ternary states, which will be referred to using the ternary digits {−, x, +}. Measured device characteristics which fall within a first range of values are assigned the ternary value '−'. Measured device characteristics which fall within a second range of values exclusive of the first range are assigned the ternary value '+'. Measured device characteristics which fall within a third range of values exclusive of the first range and the second range are assigned the ternary value 'x'.

For example, if the PUF devices are SRAM cells, the measured device characteristics may be the frequency of the binary data states stored by the SRAM cells after power cycling. Cells which are always (or almost always) in the '0' state may be assigned to the ternary state, while cells which always in the '1' state may be assigned to the '+' ternary state. Meanwhile, cells which are "unreliable" fluctuate between the '0' and '1' state may be assigned to the 'x' ternary state. The resulting ternary representations may be stored by the server in the database as initial responses for the clients. The server may disregard values generated using unreliable cells when comparing responses to expected processing instruction. In some embodiments, the may send instructions to exclude previously-characterized unreliable cells to the client (e.g., as part of the error-correction information 724). For example, if a processing instruction requires a 256-bit response the instructions may instruct the client to select the first 256 devices which are not excluded from the processing instruction generation process started at a given address, error rates can be significantly reduced using this approach when a sufficiently large number of initial responses are gathered in response to each processing instruction. In some embodiments the server shares the location of the unreliable cells with the clients during the Enrollment process, thereby reducing the size of the instructions transmitted by the server during subsequent authentication and generation of responses by the clients since the clients are able to store the information necessary to exclude the unreliable cells from the processing instruction generation process.

The value of using the ternary PUF methods above has been demonstrated with SRAM PUF devices based on commercially-available SRAM. SRAM PUFs exploit power-off/power-on cycles. Due to manufacturing variations, the flip-flop of each SRAM cell will randomly power up in the '0' state or the '1' state. The vast majority of the cells respond in a predictable way, therefore acting as a "fingerprint" of the device. The SRAM PUFs characterized exhibited a cumulative 3-5% CRP rate after each power-off/power-on cycle. The memory cells were then subjected to successive power-off/power-on cycles and cells exhibiting inconsistent behavior were deemed unreliable and represented by the ternary 'x' state as described above. After 50 cycles, the 'x' state was assigned to 10% of the cells. For the remaining cells which were not assigned the 'x' state, the error rate was in the 0.01-0.03% range.

In other embodiments, the matching engine 770 may implement methods used in response-based cryptography. As an example, the error-correction information 724 may cause the client 705 to transmit information to the server 702 (in addition to any encrypted message transfer) that allows the server 702 to detect errors in the private keys (i.e., the responses 730) generated by the client 705 and ultimately used to generate corresponding keys 740 (or complementary keys) used to encrypt a message. The server 702 may then use the matching engine 750 to align the private keys (i.e., the responses 731) obtained from the image 761 of the PUF array 760 with the private keys (i.e., the responses 730) generated by the client 705 using the PUF array 760.

Figure 7:
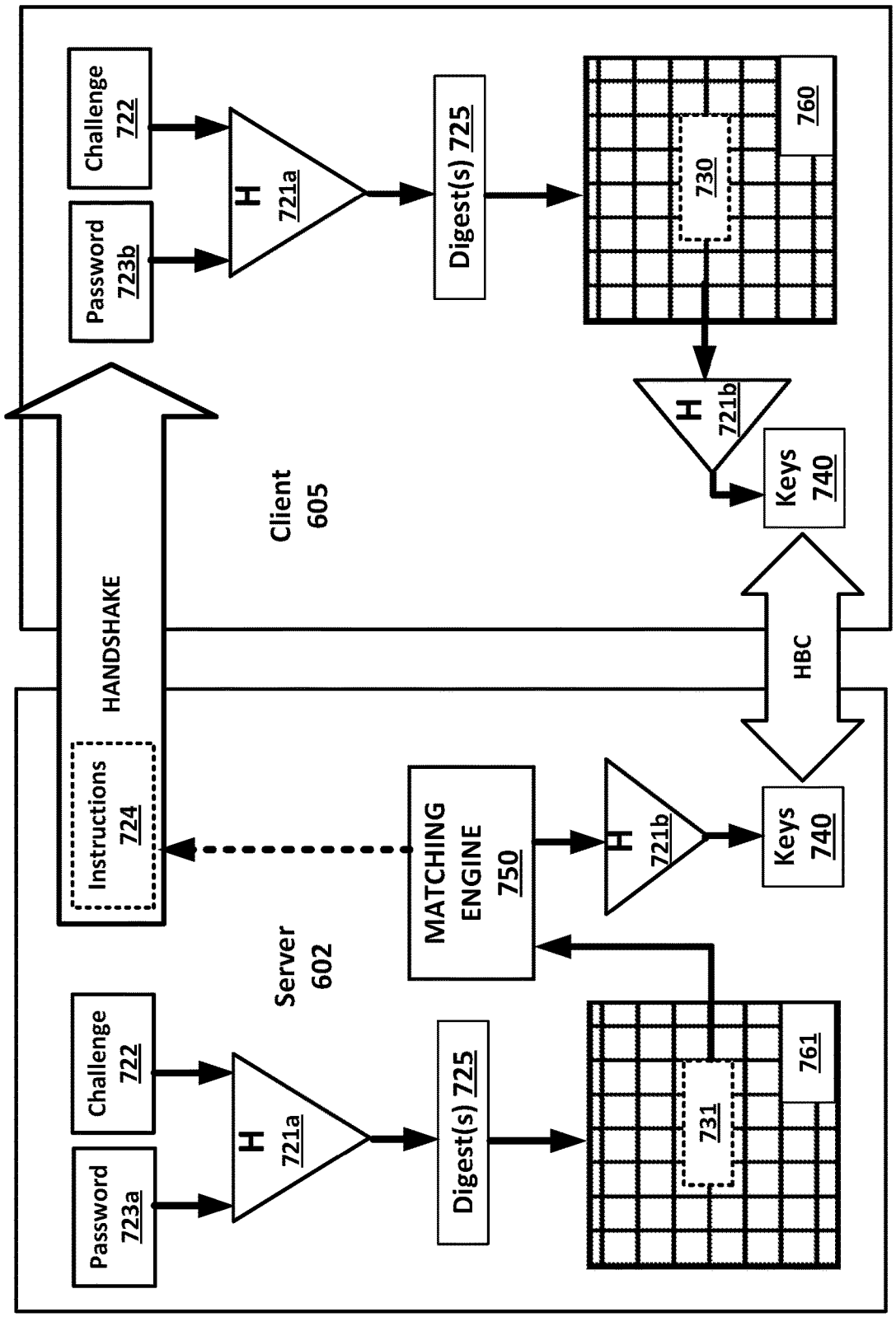
FIG. 7 is a flow diagram depicting a decryption procedure that may be practiced using the embodiment of FIG. 4.
Figure 8:
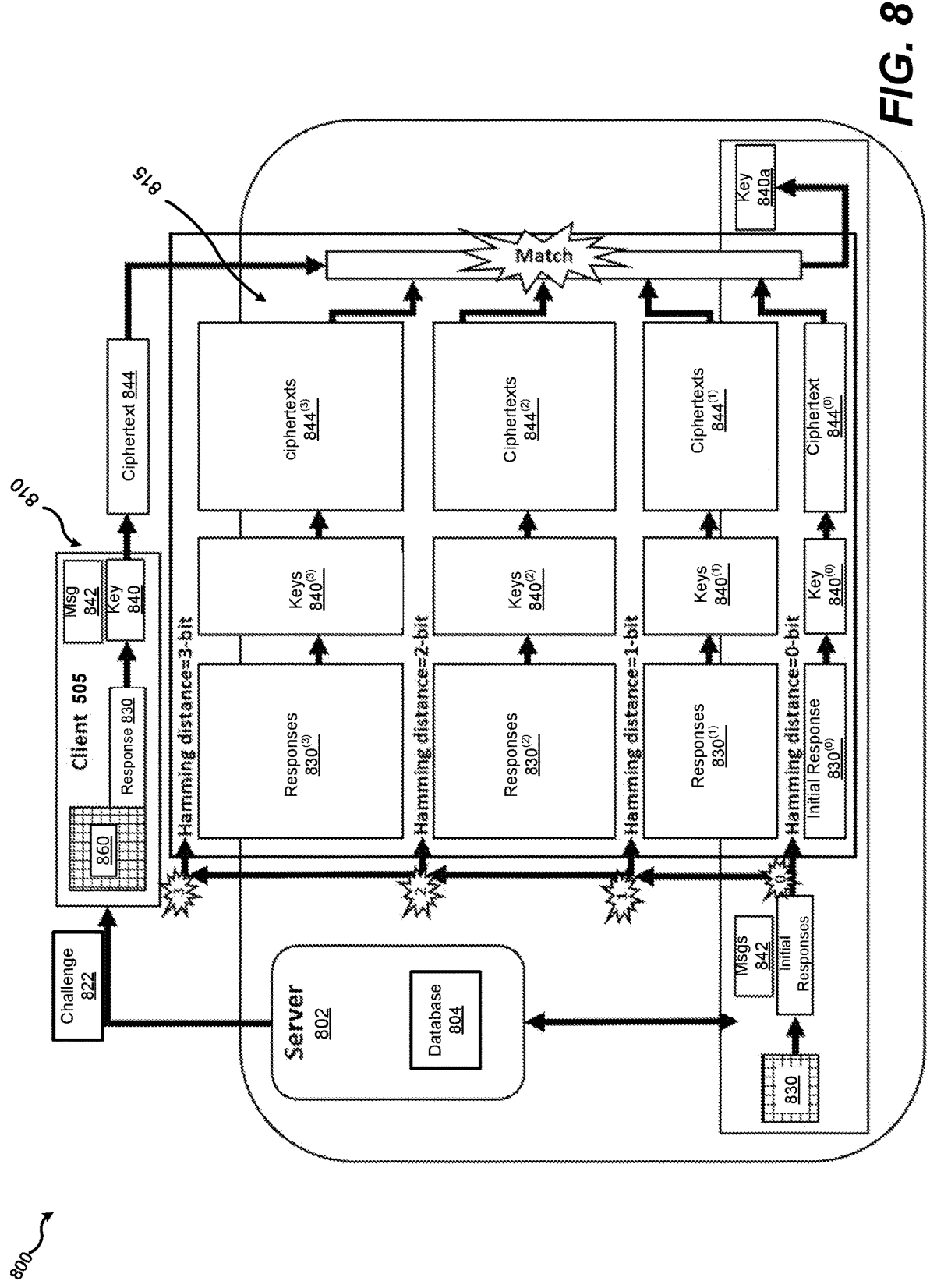
FIG. 8 is a flow diagram depicting an error-correction mechanism suitable for use with embodiments disclosed herein.

FIG. 8 shows details of an embodiment 800 wherein a server 802 uses a response-based cryptography engine (RBCE 515) suitable for use as the matching engine 750 of FIG. 7. to authenticate a client 805 (and also agree upon an encryption key with the client) when the error rate of an APG 810 with a PUF array 860 is non-zero. During Authentication, the client 805 receives the processing instruction 822 from the server 802. The server 802 stores initial responses 830 generating during enrollment in a database 804. The client 805 generates an encryption key 840 (e.g., using the processing instruction 822/response 830) and encrypts an authentication message 842 with the encryption key 840 to produce the ciphertext 844 and transmits it to the server 802 which uses the RBCE 515 to authenticate the client 505 and generate a matching encryption key 840. The server 802 may use the RBCE 515 to encrypt the same authentication message 842 with one or more encryption keys derived from expected response to the processing instruction 822 stored in the initial responses 830 for use in determining same encryption key 840 as the client 805. If encrypting the authentication message 842 with one of the server-generated encryption keys reproduces the client-generated ciphertext 844, the server may use that key to encrypt further communications with the client 805.

For example, the RBCE may use the expected response 830 (denoted initial response $530^{(O)}$) to indicate a Hamming distance of zero from the corresponding initial response 830 to generate an expected key 840 (denoted by key $840^{(O)}$) and encrypt the authentication message 842 with the key $840^{(O)}$ to produce an expected ciphertext 844 (denoted by ciphertext $844^{(O)}$. In order to account for possible CRP errors at the client 805, the RBCE 815 may generate additional responses with various Hamming distance from the expected response 830, derive additional keys 540 from those responses and produce additional ciphertext 844. For example, the RBCE 815 may generate a set of responses $830^{(1)}$ having a Hamming distance of one from the expected response 830, generate corresponding encryption keys $840^{(1)}$, and encrypt the authentication message 842 with each of those keys to produce corresponding ciphertext $544^{(1)}$. The RBCE 815 may also similarly generate ciphertext $844^{(2)}$ and $844^{(3)}$ from the authentication message 842 and the respective responses $830^{(2)}$ and $830^{(3)}$ which are sets of responses which differ from the expected response 830 by Hamming distances of two and three, respectively. In some embodiments, the RBCE 815 may be configured to produce additional ciphertexts as described above using responses which differ from the expected response 830 by even greater Hamming distances. In some embodiments, the server 802, rather than independently generating one or more ciphertexts, may instead decrypt the ciphertext 844 received from the client 805 and verify that resulting plaintext is the expected authentication message 842 for the client 805. In other embodiments, the server 802 may compute additional ciphertexts before receiving the client-generated ciphertext 844, thereby lowering latency of the Authentication phase. In some such embodiments, the additional responses may be pre-computed and stored by the server at any time after the Enrollment phase.

In some embodiments, a client 805 may transmit a public encryption key to the server 502 instead of an encrypted authentication message 842 (e.g., a ciphertext 844). The public encryption key may be generated by the client 805 using the encryption key 840 as a private-key input to an asymmetric key generation algorithm, resulting in a private/public key pair according to an acceptable asymmetric encryption scheme. The server 802 may then independently generate such a public key using expected responses derived from the initial responses 830 generated during Enrollment. Non-limiting examples of acceptable asymmetric encryption schemes include Elliptic Curve Cryptography (ECC), lattice cryptography schemes, code-based cryptography schemes, multivariate cryptography, and others.

FIGS. 9A and 9B are tables illustrating performance tradeoffs in hash-bashed schemes such as the HBC scheme illustrated in FIGS. 4-5. FIG. 9A shows the number N of 256-bit long streams ($X_i$) needed to encrypt a message M of a certain length. For example, N=16 is needed to encrypt a 128-bit long message, N=32 is needed to encrypt a 256-bit long message, and N=1,024 for an 8,192-bit long message. Increasing the number of hashing cycles used to generate each public key $Y_i$ from each private key $X_i$ from 256 to 4096 requires creates 50% fewer fragments from each message. Accordingly, fewer private keys must be hashed into public keys and fewer corresponding public keys must be hashed to encrypt the message. However, the benefit of hashing fewer keys is offset by the increased latency resulting from hashing each key many more times (e.g., hashing each private key 256 times to create a public key as opposed to hashing each private key 4,096 times to create that public key). This tradeoff is illustrated in FIG. 9B, which illustrates the number of hashing operations required. For example, 128,000 hashing cycles are needed to encrypt 8,192-bit long plaintexts when the plaintexts are divided into 256-bit segments and the private keys are hashed 256 times; however, 1,800,000 hashing cycles are needed when the plaintexts are divided into 4,096-bit fragments and the private keys are hashed 4,096 times.

The schemes above may be modified to further enhance security by increasing the computational complexity of the decryption process. In the embodiments above, the message is subdivided into the individual blocks, $M_i$, and integer values of those blocks are used as values (e.g., the values 535, 635 of FIGS. 5-6) that determine how many times each private key $X_i$ is hashed. As described above, each message block $M_i$ is used to hash a particular private key $X_i$. In some embodiments, each message block may be divided into multiple segments, each of which is used to produce a distinct integer value. Encryption and decryption using these embodiments are illustrated in a general fashion by FIG. 10.

Figure 10:
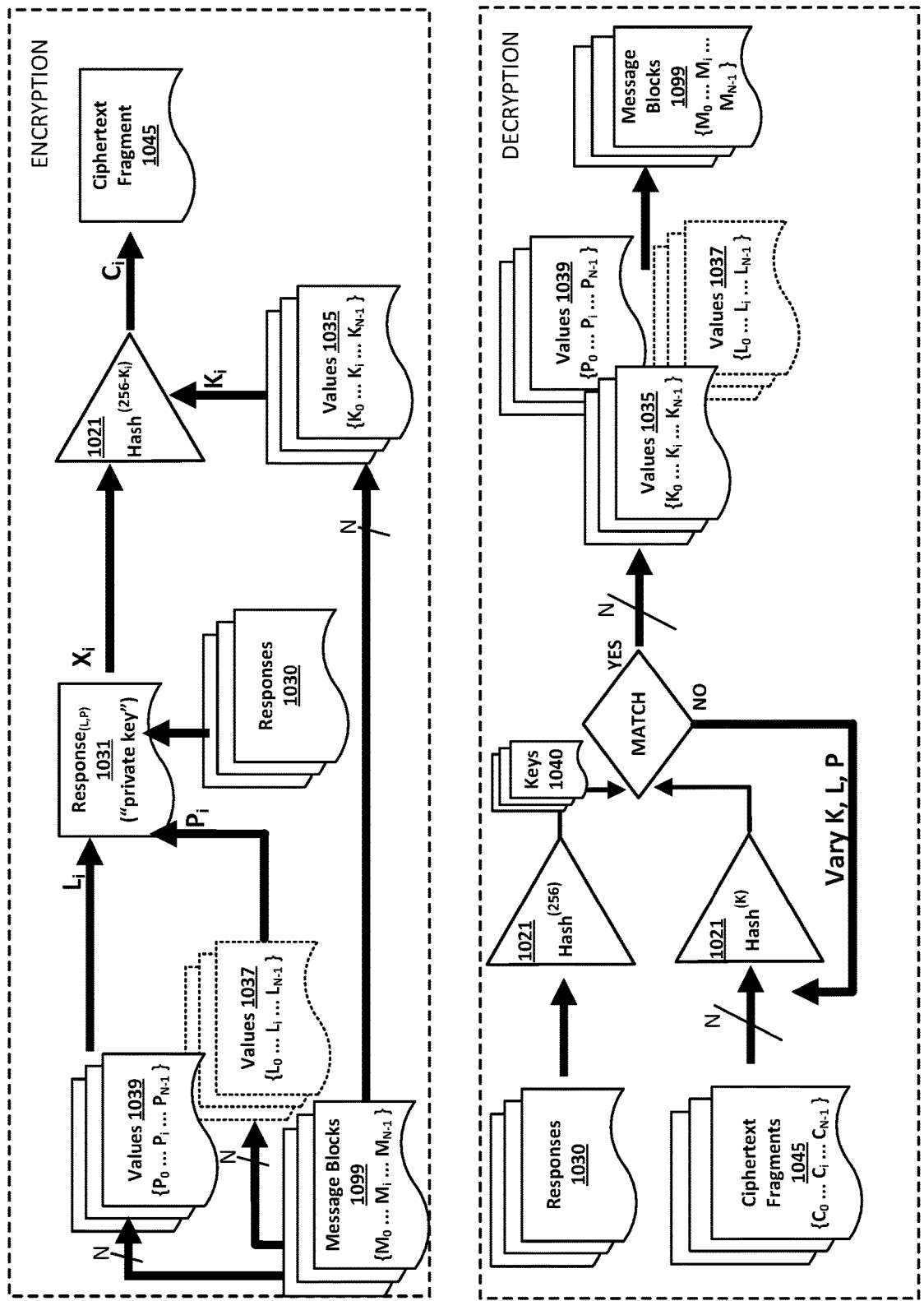
FIG. 10 is a flow diagram illustrating encryption and decryption processes in a hash-based cryptography scheme according to certain embodiments.

As shown in FIG. 10, a set of N message blocks 1099 denoted $\{M_0 \ldots M_i \ldots M_{N-1}\}$ of a message to be encrypted are used to produce the values 1035 denoted $\{K_0 \ldots K_i \ldots K_{N-1}\}$ and the values 1037 denoted $\{L_0 \ldots L_i \ldots L_{N-1}\}$. In certain embodiments, the message blocks 1099 are optionally used to produce the additional values 1039 denoted $\{P_0 \ldots P_i \ldots P_{N-1}\}$. Each set of values $\{K_i, L_i, P_i\}$ is associated with the message block 1099 used to produce it, denoted by $M_i$. Encryption is achieved using one or more values extracted from each message block (e.g., the values and optionally the values 1039) to identify, from a set of responses 1030 (e.g., responses 130, 430, 530, 630) a particular response 1031 corresponding to the selected values to be used as a private key denoted $X_{L_i P_i}$. That private key (the response 1031) is then repeatedly hashed using the hash function 1021, with the number of repetitions determined by the value 1035 ($K_i$) corresponding to the message block 1099, thereby producing a corresponding ciphertext fragment 1045 denoted $C_i$ In this example and other examples herein the number of repetitions is 256-$K_i$. However, it should be understood that the choice of 256 is a design choice and that any suitable number may be used in various applications.

Decryption works similarly to the methods described in connection with FIG. 5. However, instead of repeatedly hashing each ciphertext fragment 1045 (e.g., a ciphertext fragment 545) and comparing it to a single public key 1040 (e.g., a public key 240, 440, 540), the receiving party must compare all possible public keys 1040 against each ciphertext fragment 1045 after repeated hashing using the hash function 1021. The values 1035, 1037, 1039 ({K, L, P}) that result in a matching public key 1040 for each ciphertext fragment 1045 can then be used to reconstruct the corresponding message block 1099, as described further below in connection with particular example embodiments.

Signing and verification of messages of the embodiments above described in connection with FIG. 10 and the example embodiments which follow can be performed in the same manner as described in connection to FIG. 6, with the same modifications made in determining the correct private key $X_i$ corresponding to each message block 1099.

In one example embodiment, each message block 1099 ($M_i$) is divided into two segments, denoted $K_i$ and $L_i$. The private keys X that are 256-bits long for i∈ {0, 255}, the key hashed multiple times is $Y_i=H^{256}(X_i)$, and the message to encrypt M is 512-bit long. The message M can be written as a set of 32 blocks (e.g., the message blocks 1099) which are 16-bits long, as given by Equation 9:

$$M = \sum_{i,j} M_i = (m_{0,0} \ldots m_{0,j} \ldots m_{0,15}) \ldots, (m_{i,0} \ldots m_{i,j} \ldots m_{i,15}) \ldots,$$

$$(m_{31,0} \ldots m_{31,j} \ldots m_{31,15}) \text{ where } i\in\{0, 31\} \text{ and } j\in\{0, 15\}$$

Each block $M_i=(m_{i,0} \ldots m_{i,j} \ldots m_{i,15})$ is divided into two 8-bit segments as given by Equation 10, as one non-limiting example:

$$L_i=(m_{i,0} \ldots m_{i,7}) \text{ and } K_i=(m_{i,8} \ldots m_{i,15})$$

Both $L_i$ and $K_i$ are integer numbers ∈ {0, 255}. The key $X_{L_i}$ identified by the index $L_i$ is hashed 256-$K_i$ times. This is contrast to embodiments illustrated by FIG. 5 where the key hashed to encode the i-th message block $M_i$ is always the i-th key $X_i$. The resulting ciphertext, C, is given by Equation 11:

$$C=\Sigma C_i=H^{256-K_i}(X_{L_i})$$

$$=\{C_0=H^{256-K_0}(X_{L_0}), \ldots, C_i=H^{256-K_i}(X_{L_i}), \ldots,$$
$$C_{31}=H^{256-K_{31}}(X_{L_{31}})\}$$

The decryption scheme is similar to the one illustrated in FIG. 5 with an additional search needed at each step. Instead of simply finding the correct value for $K_i$ by repeatedly hashing the i-th ciphertext fragment until it matches the i-th public key it is now necessary to compare each repeatedly-hashed ciphertext fragment against all possible public keys. When the 256 possible hashed keys are stored in a content addressable memory (CAM), the additional latency introduced over the scheme(s) of FIG. 5 is low. The knowledge of the 32 values for each of $K_i$ and $L_i$ (e.g., the values 1035, 1037) allows decryption of the message M (e.g., the message blocks 1099). That is, in this example, each message block 1099 is simply a concatenation of the bits representing the corresponding values {$K_i$, $L_i$}. It will be understood, however, that any suitable method of extracting {$K_i$, $L_i$} from the corresponding message block M may be used and any method of transforming the values{$K_i$, $L_i$} back into the corresponding message block $M_i$ may be used.

Such a modified scheme can provide stronger encryption over the scheme(s) illustrated by FIG. 5, allowing longer messages to be encrypted while reducing the utility of attacks based on frequency analysis. The probability of any unique pairing {$K_i$, $L_i$} occurring is $(1/256)^2$ or approximately $1.53\times10^{-5}$. Accordingly, if a 1 Mbit-long message is encrypted, an average of only 8 blocks may be duplicated as compared to 2,000 blocks with some schemes.

In the previous example embodiment, it is assumed that there are 256 private keys $X_i$. In another example of embodiment, there are multiple possible keys $X_i$ (e.g., $X_{i,j}$, where j∈ {0, 255} and i∈ {0, 255}) for each message fragment $X_i$, rather than using two public keys, $X_{i,0}$ and $X_{i,0}$, as in Lamport DSA. Let us assume that the private keys $X_{i,j}$ are 256-bits long and that the corresponding public keys $Y_{i,j}=H^{256}(X_{i,j})=H^{256}(X_{L_{31}})$. If the message to be encrypted is 512-bits long, the message M can be written according to Equation 12:

$$M = \sum_{i,j} M_i = (m_{0,0} \ldots m_{0,k} \ldots m_{0,15}) \ldots, (m_{i,0} \ldots m_{i,k} \ldots m_{i,15}) \ldots,$$

$$(m_{31,0} \ldots m_{31,k} \ldots m_{31,15}) \text{ where } i\in\{0, 31\} \text{ and } k\in\{0, 15\}$$

Each message block be broken into two 8-bit segments, according to Equation 13, as one non-limiting example:

$$P_i=(m_{i,0} \ldots m_{i,7}); K_i=(m_{i,8} \ldots m_{i,15}).$$

As before, the values of $K_i$ may be used to determine the number of times the corresponding private key is hashed (i.e., 256-$K_i$ times). But now, the private key is one of 256 possible private keys identified by the index i together with corresponding value of $P_i$ and the resulting ciphertext in this scheme is given by Equation 14:

$$C = \sum_i C_i = H^{256-K_i}(X_{i,P_i}) = \{C_0 = H^{256-K_0}(X_{0,P_0}),$$

$$\ldots, C_i = H^{256-K_i}(X_{i,P_i}), \ldots, C_{31} = H^{256-K_{31}}(X_{31,P_{31}})\}$$

The decryption scheme is similar to the one described above. It is now necessary to find a match with the 256 possible hashed keys. The match will simultaneously uncover both $K_i$ and $P_i$. When the 256 possible hashed keys are stored in a content addressable memory (CAM), the additional latency of such a combined scheme is small. The knowledge of the 32 values for each of $K_i$ and $P_i$ allows reconstruction of the unencrypted message M The probability to find twice the same combination of $K_i$ and $P_i$ is: $(1/256)^2=1.53\times10^{-5}$. Accordingly, for a 1-Mbit-long message, on average 15 ciphertext blocks may have the same values, compared with 3,800 blocks in some schemes.

This scheme may be useful when PUF devices are used to generate the private keys. The different possible responses (i.e., private keys) corresponding to each possible value of $P_i$ may correspond to different areas within the PUF device and/or different physical addresses, reducing the likelihood of correlations between the keys. In some embodiments, multiple PUF devices may be used and the values of $P_i$ may index devices or ranges of devices in different PUF arrays, depending upon the value of $P_i$. Thus, even if an attacker comprises a particular portion of a PUF array or memory locations used to store PUF data, an attacker may still be prevented from compromising the encryption.

Elements of the two schemes above can be combined into a third example scheme. In this scheme, each message block is 24-bits long. If the message is 768-bits-long, the message M can be as Equation 15:

$$M = \sum_{i,k} M_i \text{ for } f\in\{0, 31\} \text{ and } k\in\{0, 23\} = (m_{0,0} \ldots m_{0,k} \ldots m_{0,23}) \ldots,$$

$$(m_{i,0} \ldots m_{i,k} \ldots m_{i,23}) \ldots, (m_{31,0} \ldots m_{31,k} \ldots m_{31,23})$$

Each message block can be separated into three 8-bit values according to Equation 17, as one non-limiting example:

$$L_i = (m_{i,0} \ldots m_{i,7}); P_i = (m_{i,8} \ldots m_{i,15}); K_i = (m_{i,16} \ldots m_{i,23})$$

In this example scheme, the value $K_i$ still determines the number of times the corresponding private key is hashed (i.e., $256-K_i$). However, the private key is now indexed using both $L_i$ and $P_i$, meaning that up to $256^2$ distinct private keys $X_{L_i,P_i}$ may be indexed and the resulting ciphertext may be given by Equation 16:

$$C = \sum_i C_i = H^{256-K_i}(X_{L_i,P_i}) = \{C_0 = H^{256-K_0}(X_{L_0,P_0}), \ldots ,$$

$$C_i = H^{256-K_i}(X_{L_i,P_i}), \ldots , C_{31} = H^{256-K_{31}}(X_{L_{31},P_{31}})\}$$

Decryption scheme is similar to the methods described above. However, up to $256^2$ public keys must be searched to determine whether repeated hashing K times of each ciphertext fragment matches one of the public keys. Determine the values $\{K_i, L_i, P_i\}$ that produce one of the public keys for each ciphertext fragment allows the corresponding unencrypted message block M to be determined. When the 256×256 possible hashed private keys (i.e., the public keys) are stored in a content addressable memory (CAM), the keys may be searched with acceptably low latency. The probability of producing any unique set of values for $\{K_i, L_i, P_i\}$ is: $(1/256)^3$ (approximately $6\times10^{-8}$). If a file of 100 Mbit is encrypted, on average 6 blocks may have the same value as compared to 400,000 blocks using some schemes.

If the messages to encrypt are smaller, it will be desirable to reduce the number of possible locations ($L_i$) and positions ($P_i$) to reduce latency. As before, the choice of particular parameters (e.g., 256 keys and 32 message blocks) presented in this example and others examples are for the purposes of illustration and any acceptable values for these and other parameters may be used in various applications.

The methods presented in this disclosure may include various additional features. As one non-limiting example, because PUFs described herein are physical which may experience drift due aging, temperature, and other effects, ternary PUF devices, error correction methods, and response-based cryptography techniques may be employed to reduce error rates and improve reliability of PUF-based cryptosystems for use with embodiments disclosed herein. As another example, cryptographic transpositions can be added to the methods described in this disclosure by using the message digest generated by the random number of the handshake to generate instructions to re-order elements of the cipher. Both communicating parties can independently access these instructions. As yet another example, the use of content-addressable memories such as CAMs based on DRAM technology may be incorporated into embodiments to lower costs.

Various example embodiments herein describe methods of using an expanded number of possible private keys that include, as non-limiting examples, allowing multiple possible private keys for each message block and indexing expanded sets of keys in various ways, including, for example, using two values (described as "position" and a "location"). It will be understood that these examples are for the purposes of illustration and that any other suitable methods may be used. For example, keys may be indexed by a single index value with greater bit-length than described in the examples. As another example, private keys may be indexed using any suitable numbers of indexing values, including three or more values, and so on, or any other acceptable scheme.

Systems and methods disclosed herein may be understood by way of various example embodiments. In one example embodiment, an encryption method uses multiple sequential hashing, combined with random ordering of the private keys generated with addressable physical unclonable functions. During an enrollment cycle, a server receives the initial readings of a physical unclonable function device belonging to a client device and stores them in an addressable look-up table. To initiate an encryption cycle, the first communicating party (the server) generates a random number, which is transmitted to the second communicating party (the client). Both communicating parties independently use the random number to find a set of addresses that are used to generate a set of N private keys. The first communicating party uses the look up table, while the second communicating party use the physical unclonable function. Both parties independently hash the private keys N times, generating a set of hashed keys (i.e., public keys).

To encrypt a message, the first communicating party converts the message into digital data streams, then group it into blocks. Each block, which is a digital stream, is converted into two decimal numbers L and K. The first decimal number L is used to find the location of one of the N private keys, and the second decimal number K is used to hash the "private key" N-K times. The cipher communicated is the combined stream of the message digests originating from the blocks of the message to encrypt. Values of L and K are computed for each block.

To decrypt the resulting ciphertext, the receiving party analyses the message digests. Each message digest is incrementally hashed several times. At each hashing step the resulting message digest is compared with all the hashed keys (i.e., public keys) generated from the private keys during the handshake step. When a final match is obtained, the number of hashes used in the process is equal to correct value of K for that block, and the location of the matching public key determines the correct value of L for that block. The entire message is thereby retrieved by putting all blocks together, and converting them into a digital stream.

Other example embodiments combine multiple sequential hashing with multiple private keys per location and use a modified encryption process. To initiate an encryption cycle in these embodiments, the first communicating party generates a random number, which is transmitted to the second communicating party. Both communicating parties independently use the random number to find a set of addresses that are used to generate a set of N×M private keys. The first communicating party uses the look up table, while the second communicating party use the physical unclonable function. Both parties independently hash the private keys N times, generating the set of "hashed keys" ("public keys").

To encrypt a message, the first communicating party converts the message into a digital data stream, then groups it into blocks. Each block, which is a digital stream, is converted into two decimal numbers P and K. The first decimal number P is used to find the position of one of the M "private keys" located at a sequential location determined by the block number (i.e., the first location corresponds to the first block, the second location to the second block, and so on), and the second decimal number K is used to determine how many times to hash the corresponding private key (i.e., N-K times). The transmitted ciphertext is the combined stream of the message digests (ciphertext blocks) originating from the blocks of the message to encrypt.

To decrypt the ciphertext, the receiving party analyses the message digests. Each ciphertext block is incrementally hashed several times. At each hashing step the new message digest is compared with the corresponding hashed keys (public keys) generated from the private keys key during handshake. When a final match is obtained for each block, the number of hashes used in the process is equal to the value of K for that block, and the position is equal to the value of P for that block. The entire message is thereby retrieved by putting all the decrypted blocks together, and converting them into a digital stream.

In other embodiments multiple hashing is used together with multiple private keys at each location and these keys are used in random orderings. To encrypt a message, the first communicating party converts the message into a digital data streams, then groups it into blocks. Each block, which is a digital stream, is converted into three decimal numbers L, P, and K corresponding to that block. The first decimal number L is used to find the location of one of the private keys, the second decimal number P is used to find the position of the selected private key located at location specified by L, and the third decimal number K is used to determine how many times to hash the private key corresponding to the current message block (i.e., N-K times). The transmitted ciphertext communicated is the combined stream of message digests produced during the encryption process.

To decrypt the ciphertext, the receiving party analyses the message digests. Each message is incrementally hashed several times. At each hashing step the resulting message digest is compared with all the N×M hashed keys (public keys) generated from the private keys during handshaking. When a final match for each block is obtained, the number of hashes used in the process is equal to the correct value of K for that block, and the location of the correct key identifies the correct value of L for that block, while the position of the correct public key determines the correct value of P for that block. The entire message is retrieved by putting all the decrypted blocks together, and converting them into a digital stream.

Any acceptable hashing or other schemes may be used including, as non-limiting examples: Winternitz, W-OTS, Merkle Signature Schemes, MSS, or XMSS. In embodiments using random key ordering, any acceptable scheme(s) may be used including, as non-limiting examples, HORS, SHINCS, or derivatives thereof. In embodiments multiple address schemes, any acceptable scheme(s) may be used including, as non-limiting examples, Lamport DSA and derivatives thereof.

Nonlimiting examples of acceptable physical unclonable function (PUF) technologies for use with embodiments herein include PUFs based on SRAM, Flash memory, DRAM, MRAM, Resistive RAM, memristor, CBRAM, ring oscillators, gate delay PUFs, or FPGAs. Additional randomization may be used to spread the location of the cells selected to generate the private keys from the look up tables and addressable PUFs. In addition, multiple handshakes may be used to encrypt longer messages, or enhance security in embodiments disclosed herein.

The described features, advantages, and characteristics may be combined in any suitable manner in one or more embodiments. One skilled in the relevant art will recognize that the various embodiments may be practiced without one or more of the specific features or advantages of a particular embodiment. In other instances, additional features and advantages may be recognized in certain embodiments that may not be present in all embodiments.

It should be understood that, unless explicitly stated or otherwise required, the features disclosed in embodiments explicitly described herein and elsewhere in this disclosure may be used in any suitable combinations and using various suitable parameters. Thus, as a non-limiting example, any method described herein or any other suitable method may be used to determine measurement parameters of for measuring the characteristics of PUF device. As a non-limiting example, the message length, the size of message fragments, address lengths, the size of PUF arrays used and other parameters may be varied as desired for different applications. It should also be understand that while memristor-based PUF devices are discussed in the examples herein, they are intended as non-limiting examples of suitable PUF technologies. It should also be understood that although examples herein disclose hashing responses or private keys 256 times, that nothing herein is intended to require the use of 256 hashing cycles to generate the keys used for the hash-based encryption/decryption processes disclosed herein and that other suitable values may be chosen. It should also be understood that descriptions of repeated hashing with a hash are intended for purposes of illustration only and that any suitable one-way cryptographic function, as described above, may be used.

The invention claimed is:
1. A system, comprising:
a processor, and memory coupled to the processor, the memory storing:
  device data representing measured device characteristics of physical-unclonable-function ("PUF") arrays having pluralities of PUF devices, each PUF array belonging to one of a plurality of computing devices, wherein each computing device of the plurality of computing device is part of a network of computing devices; and
  executable instructions that, when executed by the processor, cause the processor to:
    transmit a processing instruction to a remote device, the processing instruction causing the remote device is to determine a set of PUF devices belonging to the PUF array of the remote device and measure characteristics of those PUF devices;
    determine expected measurement values of characteristics of the set of PUF devices measured by the remote device by using the processing instruction to identify and retrieve a subset of the device data stored in the memory and associated with the set of PUF devices measured by the remote device;
    derive a set of encryption keys from the expected measurement values; and communicate with the remote device by performing a cryptographic operation secured by the set of encryption keys that includes:
  segmenting a first datastream into a first plurality of datastream fragments;
  segmenting a first data stream fragment of the first plurality of datastream fragments into a first numeric value and a second numeric value;
  identifying, using the first numeric value, a first encryption key of the set of encryption keys; and
  applying a one-way cryptographic function to the first encryption key a first number of times determined by the second numeric value to generate a transformed fragment having a value that depends on the values of the first numeric value and the second numeric value from the first data stream fragment and a value of the first encryption key.

2. The system of claim 1, wherein the instructions, when executed by the processor to perform the cryptographic operation, cause the processor to:
  receive, as a second data stream, a ciphertext generated by the remote device;
  extract a second data stream fragment from the second data stream; and
  for a second encryption key in the set of encryption keys:
    repeatedly apply the one-way cryptographic function to the second data stream fragment a second number of times to produce an intermediate result that is equivalent to a result of repeatedly applying the one-way cryptographic function to the second encryption key the second number of times;
    output, as a decrypted value of the second data stream fragment an output value including the second number of times the one-way cryptographic function was repeatedly applied to the second data stream fragment and a third numeric value associated with the second encryption key.

3. The system of claim 1, wherein the instructions, when executed by the processor to perform the cryptographic operation, cause the processor to:
  identify, using the first numeric value, the first encryption key of the set of encryption keys by using the first numeric value as an index value in accessing an encryption key array that includes the set of encryption keys; and
  determining the first number of times by subtracting the second numeric value from a predetermined number.

4. The system of claim 1, wherein the instructions, when executed by the processor to issue the processing instruction to the remote device, cause the processor to:
  transmit error correction information to the remote device that enables the remote device to correct erratic measurements of the set of PUF devices determined using the processing instruction.

5. The system of claim 4, wherein the memory stores further instructions that, when executed by the processor cause the processor to receive information from the remote device associated with measurements of the characteristics of the set of PUF devices determined using the processing instruction to:
  determine that actual measurement values of characteristics of the set of PUF devices determined using the processing instruction and measured by the remote device in response to the processing instruction differ from stored measurement values of the characteristics of the set of PUF devices determined using the processing instruction in the device data stored in the memory; and
  apply an error-correction algorithm to stored measurement values of the characteristics of the set of PUF devices determined using the processing instruction in the device data stored in the memory to produce the expected measurement values used to generate the one or more encryption keys.

6. The system of claim 1, wherein the one-way cryptographic function includes at least one of a SHA-1, SHA-2, SHA-3, SHA-224, SHA-256, SHA-384, SHA-512, MD5, MD6, and SWIFT function.

7. A system, comprising:
  a processor, and memory coupled to the processor, the memory storing:
    device data representing measured device characteristics of at least one physical-unclonable-function ("PUF") device; and
    executable instructions that, when executed by the processor, cause the processor to:
      derive a set of encryption keys from the measured device characteristics of the at least one PUF device; and
      communicate with a remote device by performing a cryptographic operation secured by the set of encryption keys that includes:
        segmenting a first data stream into a first plurality of data stream fragments;
        segmenting a first data stream fragment of the first plurality of data stream fragments into a first numeric value and a second numeric value;
        identifying, using the first numeric value, a first encryption key of the set of encryption keys; and
        applying a one-way cryptographic function to the first encryption key a first number of times determined by the second numeric value to generate a transformed fragment having a value that depends on the values of the first numeric value and the second numeric value from the first data stream fragment and a value of the first encryption key.

8. The system of claim 7, wherein the instructions, when executed by the processor to perform the cryptographic operation, cause the processor to:
  receive, as a second data stream, a ciphertext generated by the remote device;
  extract a second data stream fragment from the second data stream; and
  for a second encryption key in the set of encryption keys:
    repeatedly apply the one-way cryptographic function to the second data stream fragment a second number of times to produce an intermediate result that is equivalent to a result of repeatedly applying the one-way cryptographic function to the second encryption key the second number of times;
    output, as a decrypted value of the second data stream fragment an output value including the second number of times the one-way cryptographic function was repeatedly applied to the second data stream fragment and a third numeric value associated with the second encryption key.

9. The system of claim 7, wherein the instructions, when executed by the processor to perform the cryptographic operation, cause the processor to:

identify, using the first numeric value, the first encryption key of the set of encryption keys by using the first numeric value as an index value in accessing an encryption key array that includes the set of encryption keys; and determining the first number of times by subtracting the second numeric value from a predetermined number.

10. The system of claim 7, wherein the instructions, when executed by the processor cause the processor to:

issue a processing instruction to the remote device; and transmit error correction information to the remote device that enables the remote device to correct erratic measurements of a set of PUF devices determined using the processing instruction.

11. The system of claim 10, wherein the memory stores further instructions that, when executed by the processor cause the processor to receive information from the remote device associated with measurements of the characteristics of the set of PUF devices determined using the processing instruction to:

determine that actual measurement values of characteristics of the set of PUF devices determined using the processing instruction and measured by the remote device in response to the processing instruction differ from stored measurement values of the characteristics of the set of PUF devices determined using the processing instruction in the device data stored in the memory; and apply an error-correction algorithm to stored measurement values of the characteristics of the set of PUF devices determined using the processing instruction in the device data stored in the memory to produce the expected measurement values used to generate the one or more encryption keys.

12. The system of claim 7, wherein the one-way cryptographic function includes at least one of a SHA-1, SHA-2, SHA-3, SHA-224, SHA-256, SHA-384, SHA-512, MD5, MD6, and SWIFT function.

13. A method, comprising:

deriving a set of encryption keys from measured device characteristics of at least one PUF device; and communicating with a remote device by performing a cryptographic operation secured by the set of encryption keys that includes:

segmenting a first data stream into a first plurality of data stream fragments;

segmenting a first data stream fragment of the first plurality of data stream fragments into a first numeric value and a second numeric value;

identifying, using the first numeric value, a first encryption key of the set of encryption keys; and applying a one-way cryptographic function to the first encryption key a first number of times determined by the second numeric value to generate a transformed fragment having a value that depends on the values of the first numeric value and the second numeric value from the first data stream fragment and a value of the first encryption key.

14. The method of claim 13, further comprising:

receiving, as a second data stream, a ciphertext generated by the remote device;

extracting a second data stream fragment from the second data stream; and for a second encryption key in the set of encryption keys:

repeatedly applying the one-way cryptographic function to the second data stream fragment a second number of times to produce an intermediate result that is equivalent to a result of repeatedly applying the one-way cryptographic function to the second encryption key the second number of times; and outputting, as a decrypted value of the second data stream fragment an output value including the second number of times the one-way cryptographic function was repeatedly applied to the second data stream fragment and a third numeric value associated with the second encryption key.

15. The method of claim 13, further comprising:

identifying, using the first numeric value, the first encryption key of the set of encryption keys by using the first numeric value as an index value in accessing an encryption key array that includes the set of encryption keys; and determining the first number of times by subtracting the second numeric value from a predetermined number.

16. The method of claim 13, further comprising:

transmitting error correction information to the remote device that enables the remote device to correct erratic measurements of a set of PUF devices determined using a processing instruction.

17. The method of claim 16, further comprising:

receiving information from the remote device associated with measurements of the characteristics of the set of PUF devices determined using the processing instruction to:

determining that actual measurement values of characteristics of the set of PUF devices determined using the processing instruction and measured by the remote device in response to the processing instruction differ from stored measurement values of the characteristics of the set of PUF devices determined using the processing instruction in device data stored in a memory; and applying an error-correction algorithm to stored measurement values of the characteristics of the set of PUF devices determined using the processing instruction in the device data stored in the memory to produce the expected measurement values used to generate the one or more encryption keys.

18. The method of claim 13, wherein the one-way cryptographic function includes at least one of a SHA-1, SHA-2, SHA-3, SHA-224, SHA-256, SHA-384, SHA-512, MD5, MD6, and SWIFT function.

* * * * *